United States Patent
Kunieda et al.

(10) Patent No.: US 11,978,133 B2
(45) Date of Patent: May 7, 2024

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Hiroyasu Kunieda, Tokyo (JP); Jumpei Takeichi, Tokyo (JP); Takayuki Yamada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 242 days.

(21) Appl. No.: 17/191,767

(22) Filed: Mar. 4, 2021

(65) Prior Publication Data
US 2021/0287412 A1 Sep. 16, 2021

(30) Foreign Application Priority Data
Mar. 16, 2020 (JP) .................... 2020-045618

(51) Int. Cl.
*G06T 11/00* (2006.01)
*G06F 18/22* (2023.01)
(Continued)

(52) U.S. Cl.
CPC .............. *G06T 11/00* (2013.01); *G06F 18/22* (2023.01); *G06T 3/40* (2013.01); *G06T 7/0002* (2013.01);
(Continued)

(58) Field of Classification Search
CPC . G06T 11/60; G06T 11/00; G06T 3/40; G06T 7/0002; G06T 2200/24; G06T 2207/20081; G06T 2207/30168; G06T 1/60; G06T 2207/10004; G06T 5/006; G06T 7/0004; G06T 7/11; G06T 19/003; G06T 2207/30124; G06T 7/13; G06T 7/337; G06T 11/206; G06T 15/10; G06T 17/00; G06T 17/05; G06T 17/20;
(Continued)

(56) References Cited

U.S. PATENT DOCUMENTS

2005/0134947 A1* 6/2005 Tsue .................. H04N 1/00167
358/1.9
2018/0146105 A1* 5/2018 Saito .................. H04N 1/00461
2020/0012877 A1 1/2020 Kotake et al.

FOREIGN PATENT DOCUMENTS

JP 2019-215593 A 12/2019

* cited by examiner

*Primary Examiner* — Manuchehr Rahmjoo
(74) *Attorney, Agent, or Firm* — Carter, DeLuca & Farrell LLP

(57) ABSTRACT

An album creating app obtains album data on a model album serving as an example, a candidate image group used to create an album, and analysis information on a model image in the model album and on each of the candidate image group. The album creating app has a similar image selecting unit that selects a similar image similar to the model image from the candidate image group based on the analysis information, a spread layout creating unit that creates a layout according to a template in the album data by placing the similar image in the slot where the model image corresponding to the similar image is placed, a layout evaluating unit that evaluates the layout created, and a processing changing unit that changes, based on the evaluation result, the type of editing performed on the similar image to place the similar image into the slot.

20 Claims, 13 Drawing Sheets

(51) Int. Cl.
*G06T 3/40* (2006.01)
*G06T 7/00* (2017.01)
*G06T 11/60* (2006.01)
*G06V 10/42* (2022.01)
*G06V 10/44* (2022.01)
*G06V 10/56* (2022.01)
*G06V 10/74* (2022.01)
*G06V 40/16* (2022.01)

(52) U.S. Cl.
CPC .............. *G06T 11/60* (2013.01); *G06V 10/42* (2022.01); *G06V 10/44* (2022.01); *G06V 10/56* (2022.01); *G06V 10/761* (2022.01); *G06V 40/172* (2022.01); *G06T 2207/30168* (2013.01)

(58) Field of Classification Search
CPC ....... G06T 2200/08; G06T 2207/10008; G06T 2207/10061; G06T 2207/20004; G06T 2207/20021; G06T 2207/20041; G06T 2207/20084; G06T 2207/20164; G06T 2207/30004; G06T 2207/30148; G06T 2207/30201; G06T 2207/30264; G06T 2210/04; G06T 3/4038; G06T 5/30; G06T 7/00; G06T 7/001; G06T 7/136; G06T 7/155; G06T 7/181; G06T 7/20; G06T 7/35; G06T 7/66; G06K 9/6215; G06K 15/181; G06K 9/6267; G06K 9/6201; G06K 9/6268; G06K 9/00; G06K 9/6247; G06K 9/6256; G06K 9/6269; G06K 9/629

See application file for complete search history.

FIG.3A

| NO. OF PAGES | SIZE (W) | SIZE (H) | PAPER TYPE | BINDING PORTION |
|---|---|---|---|---|
| 20 | 150 | 150 | GLOSS PAPER | PERFECT BINDING |

FIG.3B

| SPREAD NO. | x | y | w | h | angle | image path |
|---|---|---|---|---|---|---|
| 0 | 150 | 0 | 150 | 150 | 0 | image1.jpg |
| 1 | 10 | 10 | 130 | 130 | 0 | image12.jpg |
| 1 | 160 | 10 | 130 | 130 | 0 | image15.jpg |
| 2 | 10 | 10 | 130 | 60 | 0 | image19.jpg |
| 2 | 10 | 80 | 130 | 60 | 0 | image20.jpg |
| 2 | 175 | 10 | 100 | 130 | 0 | image22.jpg |
| ... | ... | ... | ... | ... | ... | ... |
| 10 | 0 | 0 | 300 | 150 | 0 | image103.jpg |
| 10 | 20 | 60 | 60 | 80 | 10 | image5.jpg |

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium.

Description of the Related Art

In addition to the spread of digital cameras, the recent spread of smart devices and improvement in the camera performance of the smart devices contribute to a drastic increase in the number of pictures that users take. With the increase in the number of pictures taken, a wider variety of subjects are shot.

Japanese Patent Laid-Open No. 2019-215593 describes a technique for creating a new album using a second group of images by determining the output form of desired ones of the second group of images using information on a first group of images inputted for creating a previous album.

SUMMARY OF THE INVENTION

However, in a case where the output form determined includes editing of the images, the images placed in the album may lose desired finished quality as a result of being edited.

A program according to an aspect of the present invention is a non-transitory computer readable storage medium storing a program which causes a computer to function as: an obtaining unit configured to obtain album data on a model album to serve as an example, analysis information on a model image placed in the model album, a group of candidate images used to create an album, and analysis information on each of the group of candidate images; a selecting unit configured to select a similar image similar to the model image from the group of candidate images based on the analysis information on the model image and the analysis information on the group of candidate images; a creating unit configured to create a layout according to a template included in the album data by placing the similar image in a slot at a same position as a slot in which the model image corresponding to the similar image is placed; an evaluating unit configured to evaluate the layout created; and a changing unit configured to change, based on an evaluation result obtained by the evaluating unit, a type of editing performed on the similar image to place the similar image into the slot.

Further features of the present invention will become apparent from the following description of exemplary embodiments with reference to the attached drawings.

BRIEF DESCRIPTION OF THE DRAWINGS

FIGS. 3A and 3B are diagrams showing the structure of album data:

DESCRIPTION OF THE EMBODIMENTS

Preferred embodiments of the present invention will be described in detail below with reference to the attached drawings. It should be noted that the following embodiments are not intended to limit the present invention defined by the scope of claims, and not all the combinations of features described in the embodiments herein are necessarily essential to the solving means of the present invention.

First Embodiment

In the present embodiment, an image processing apparatus runs an album creating application (also called an "application" or simply an "app" hereinbelow), and generates, on the application, album data in which a plurality of picture images are automatically laid out. Then, this album data is printed to create a plurality of albums in print form. Based on model album data, the present embodiment creates album data similar to the model album data using a group of images different from a group of images arranged in the example album data. More specifically, the present embodiment creates album data which has the same number of pages as the model album data and in which images similar to model images arranged on the pages of the model album data are arranged at the same positions as the model images. This can simplify troublesome work such as selecting images from a large number of images taken, determining layouts, and determining templates.

A wedding album is a specific example of an album created based on album data similar to model album data. Albums with fixed formats, such as wedding albums, are created by arranging images taken throughout a ceremony with a fixed style, such as exchanging wedding rings, cutting the cake, and making speeches, are arranged in the same order as they happened. For such creation of an album, an album to serve as an example is prepared, and images similar to model images in the model album are selected and arranged. Thus, an album with beautiful layouts can be created efficiently.

In some cases, images similar to model images in a model album may be edited in order to be placed according to a template in the model album. Then, the images may not come out as the model images do because, for example, the composition is displaced from or the resolution is different from those in the model images. In an example described in the following embodiments, in the event where an image is edited to be placed according to a template in a model album, processing is performed so that the edited image may have desired finished quality.

<Hardware Configuration of the Image Processing Apparatus>

Figure 1:
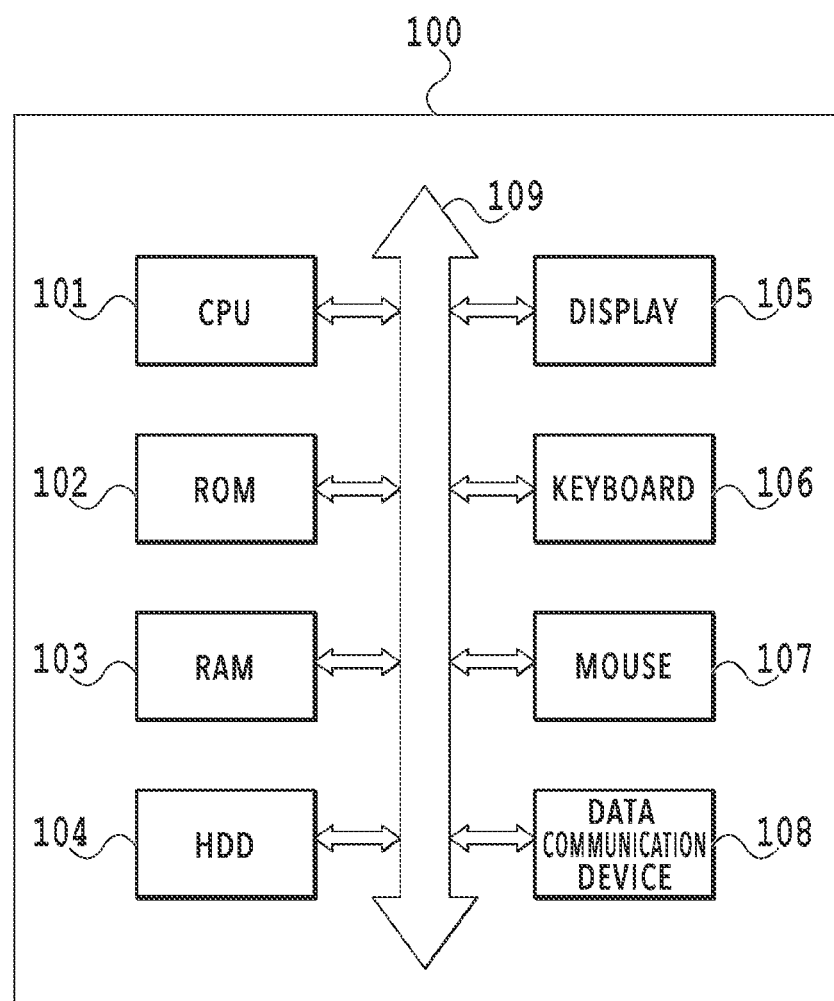
FIG. 1 is a block diagram showing the hardware configuration of an image processing apparatus.

FIG. 1 is a diagram showing the hardware configuration of an image processing apparatus of the present embodiment. Although the following describes an example where the image processing apparatus is an information processing apparatus (PC), other apparatuses, such as a smartphone, may be employed as the image processing apparatus.

As shown in FIG. 1, an image processing apparatus 100 has a CPU 101, a ROM 102, a RAM 103, an HDD 104, a display 105, a keyboard 106, a mouse 107, and a data communication device 108. They are connected via a data bus 109, so that data can be transmitted and received between them.

The CPU 101 performs overall control of the image processing apparatus 100. The CPU 101 executes an image processing method described in the present embodiment according to programs. Although the image processing apparatus has only one CPU in FIG. 1, the image processing apparatus may have more than one CPU.

The ROM 102 stores programs executed by the CPU 101. The RAM 103 provides memory where the CPU 101 temporarily stores various kinds of information during execution of the programs. The HDD 104 stores, for example, image files and a database that retains results of processing such as image analysis. In the present embodiment, the HDD 104 is where an album creating application program is stored. This application program may also be called an album creating app. A description will be given later about the album creating app using FIG. 2 and other drawings.

The display 105 is a display device for displaying and presenting to a user a user interface (UI) and resulting layouts of images of the present embodiment. The display 105 may have a touch sensor feature. The keyboard 106 is one of the input devices that the image processing apparatus 100 has, and is used to, for example, input predetermined information on a graphical user interface (GUI) displayed on the display 105. In the present embodiment, a user inputs album creating conditions through the keyboard 106. The mouse 107 is one of the input devices that the image processing apparatus 100 has, and is used to, for example, click on and press a button on the GUI displayed on the display 105. The display 105 may be a device external to the image processing apparatus 100.

The data communication device 108 is a device for communicating with external devices such as a printer or a server. For example, through the data communication device 108, album data having images automatically laid out is transmitted to the printer or the server connected to the image processing apparatus 100. The data bus 109 connects the above-described constituents and the CPU 101 together. This is the hardware configuration of the image processing apparatus of the present embodiment.

<Software Configuration of the Image Processing Apparatus>

Figure 2:
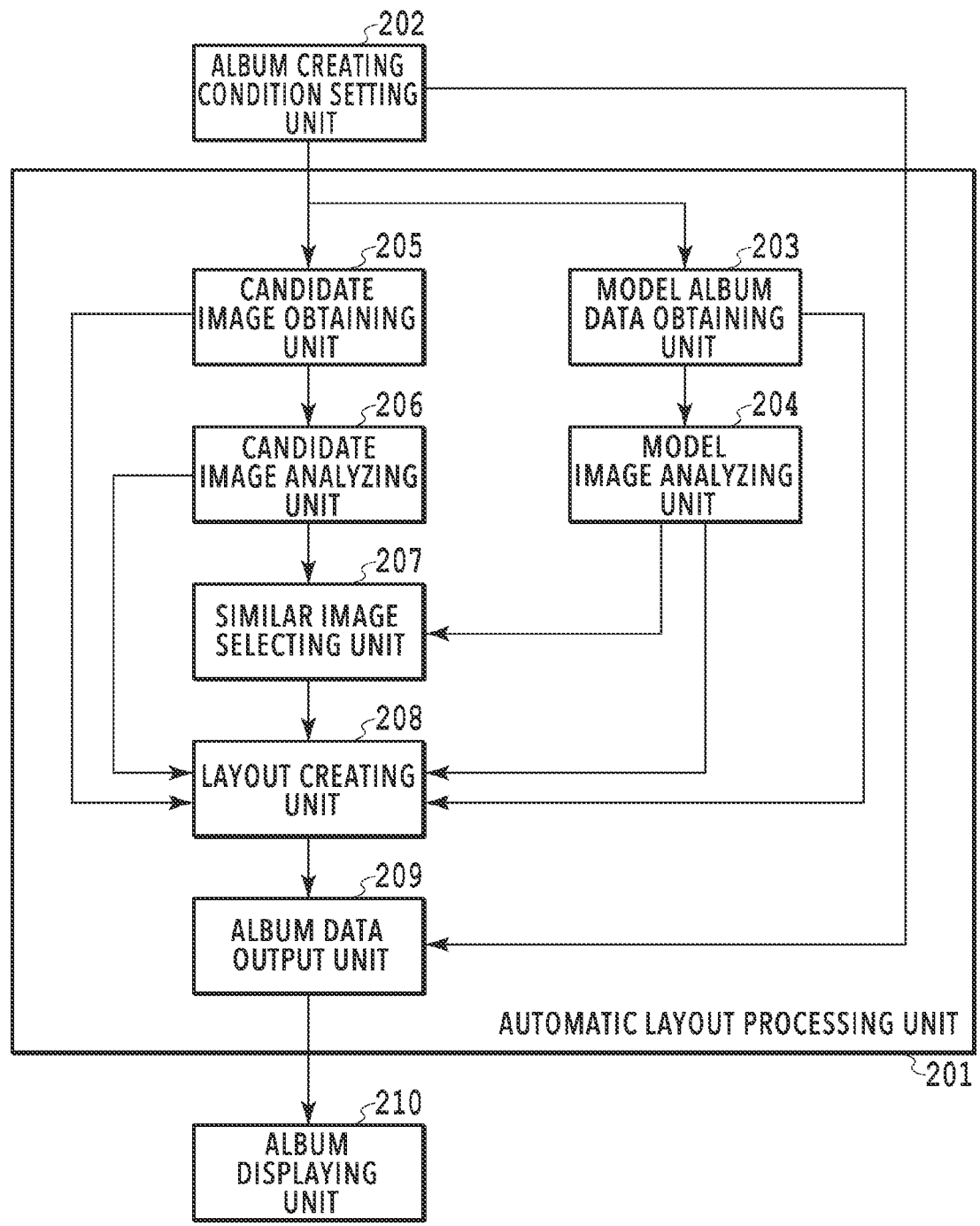
FIG. 2 is a block diagram showing the software configuration of the image processing apparatus.

FIG. 2 is a diagram showing the software configuration of the image processing apparatus of the present embodiment, or in other words, the functions implemented by an album creating application installed in the image processing apparatus. The album creating application is activated by a user double-clicking on an icon of the application displayed on the display 105 using the mouse 107. Although the album creating application has various functions, the following mainly describes an automatic layout function provided by an automatic layout processing unit 201.

As shown in FIG. 2, this app has an album creating condition setting unit 202, the automatic layout processing unit 201, and an album displaying unit 210. The "automatic layout function" is to create album data by classifying or selecting images of pictures taken based on their contents and attributes and then laying out the selected images. Contents of the album data thus created are displayed on the display 105.

The album creating condition setting unit 202 displays a GUI to be described later, and sets album creating conditions specified by a user through the GUI, for the automatic layout processing unit 201. In the present embodiment, model album data, a group of images to be used to create a new album, and an album product are set as the album creating conditions. The model album data may be set based on the structure of a file system in which the album data is stored, such as, for example, specifying a file or a directory, or may be selected from preset options registered in the app beforehand. The group of images may be set using, for example, information accompanying each individual set of image data, such as shooting date and time, and attribute information, or may be set based on the structure of a file system in which the image data is stored, such as, for example, specifying a device or a directory. Information on an album product includes the type of paper used in the album, the style of the binding portion of the album, and the like.

Here, a description about an album created in the present embodiment is given. In the present embodiment, an album is formed by cover pages and a plurality of spreads. For example, a "spread" corresponds to a single window in digital representation and corresponds to a pair of adjacent pages (i.e., two pages) of an open book in printed form. Such a spread of two pages may be formed by separate prints bound to be adjacent to each other or formed by a single print folded in the middle. Although the following description uses the above concept of spreads, the concept of pages may be used instead. In the present embodiment, album data similar to model album data is created based on model album data and a group of images set by the album creating condition setting unit 202.

Album data herein includes image data on each image placed in an album as well as information on the image such as the number of the spread on which the image is placed, the position of the image, and the size of the image.

FIGS. 3A and 3B show an example of album data used in the present embodiment. FIG. 3A shows an example product table (product information) indicating overall information on an album. Items recorded in the product table include the number of pages, the size of the album, the type of print paper, and the binding style.

FIG. 3B shows an example of a slot table representing images placed on the paper and the positions of the images. Items recorded in the columns of the slot table include an image placed in the album, the spread number, the position of the image, the size of the image, and the angle of the image. Hereinbelow, information presented in a single row of the table in FIG. 3B is called a slot, and a group of slots belonging to the same spread number in model album data is collectively called a template. It should be noted that information included in album data is not limited to the above. Slot information may include information such as layer information indicating the order in which overlapping images are displayed, the trimming amount, the effect type, text information, and graphic information. Examples of the effect type include gradation, monochrome, and sepia. Slot information may also include information on a frame embellishment.

Figure 4:
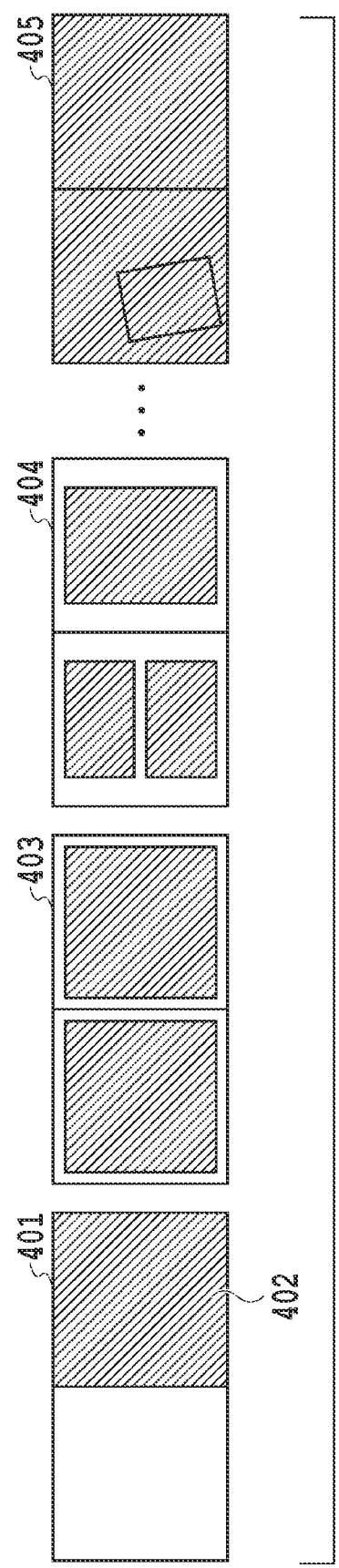
FIG. 4 is a diagram showing album layouts.

FIG. 4 is example layouts of the album data in FIGS. 3A and 3B. Cover pages 401, a spread 403, a spread 404, and a spread 405 laid out in FIG. 4 correspond to the spread numbers 0, 1, 2, and 10 in FIG. 3B, respectively. The left and right pages of the cover pages 401 correspond to the back cover and the front cover, respectively. The hatched areas in FIG. 4 are slots where the image data recorded in the column "image path" in FIG. 3B are placed. For example, "image1.jpg" is placed in a slot 402. The automatic layout processing to be described later creates album data in which images having image characteristics, such as compositions, objects, and tones, similar to the images arranged in the model album data are arranged at the same positions as those in the model album data.

Referring back to FIG. 2, the description of the app is continued. From album data stored in the HDD 104, a model album data obtaining unit 203 obtains model album data set by the album creating condition setting unit 202.

A model image analyzing unit 204 analyzes each of images included in the group of images in the model album data obtained by the model album data obtaining unit 203. The images included in the group of images in the model album data are called model images herein. In the present embodiment, the model image analyzing unit 204 derives the feature value of each model image, and determines an object in the image, determines the composition of the image, detects a face, recognizes an expression on the face detected, and executes personal recognition of the face detected. The model image analyzing unit 204 also refers to data accompanying the image data obtained from the HDD 104 (e.g., Exif information) and thereby obtains information on the shooting date and time. Information obtained by the model image analyzing unit 204 as a result of the analysis of image data is called "analysis information."

From the images stored in the HDD 104, a candidate image obtaining unit 205 obtains a group of images which are set as input images by the album creating condition setting unit 202. The group of images here refers to a group of candidate images (candidate image group) which may be used in a layout in the album to be created. The images stored in the HDD 104 include still images and images extracted from videos. The still images and extracted images are obtained from an image capturing device such as a digital camera or a smart device. The image capturing device may be included in the image processing apparatus 100 or in an apparatus external to the image processing apparatus 100. In a case where the image capturing device is an external device, the candidate image obtaining unit 205 obtains images via the data communication device 108. The still images and extracted images may be obtained from an external network or server via the data communication device 108. Examples of images obtained from a network or server include social networking service (SNS) images. Note that the images obtained by the candidate image obtaining unit 205 are not limited to the above and may be images of other types.

A candidate image analyzing unit 206 analyzes image data obtained from the candidate image obtaining unit 205. In the present embodiment, the candidate image analyzing unit 206 derives a feature value of each candidate image, and determines an object in the image, determines the composition of the image, detects a face, recognizes an expression on the face detected, and executes personal recognition of the face detected. Further, the candidate image analyzing unit 206 refers to data accompanying the image data obtained from the HDD 104 (e.g., Exif information) and thereby obtains information on the shooting date and time.

Also, the candidate image obtaining unit 205 performs analysis using an image score indicating whether the image is suitable for the album. A high image score is given to a highly aesthetic image with, for example, high contrasts or sharp edges. Also, a high image score is given to an image with good content, in which, for example, no one is blinking, or a main subject such as a person or a building is in a large size.

From the candidate images, a similar image selecting unit 207 selects images to use for the album based on the analysis information on the model images obtained by the model image analyzing unit 204 and the analysis information on the candidate images obtained by the candidate image analyzing unit 206 (the images thus selected are hereinafter referred to as similar images). For each model image, the similar image selecting unit 207 selects a similar image from the candidate images. A similar image is an image whose similarity to the model image is higher than a predetermined value. The similarity is, for example, the distance between the image feature value derived by the model image analyzing unit 204 and the image feature value derived by the candidate image analyzing unit 206. The shorter this distance, the higher the similarity. For the similarity determination, the result of personal recognition performed by the candidate image analyzing unit 206 in selecting similar images may be used, or whether the image score is high or low may be added to the criteria for the selection.

A layout creating unit 208 allocates similar images to a model template using the model album data obtained by the model album data obtaining unit 203 and the similar images selected by the similar image selecting unit 207. Data in which similar images are allocated to a model template is called a layout. The layout creating unit 208 evaluates the layout created, and changes processing according to the evaluation results. In this event, the layout creating unit 208 obtains candidate images from the candidate image obtaining unit 205 as needed and obtains analysis information from the model image analyzing unit 204 and analysis information from the candidate image analyzing unit 206. The layout creating unit 208 also obtains, as needed, product information included in the album data obtained by the model album data obtaining unit 203. Then, the layout creating unit 208 changes processing using the information obtained. Details will be given later.

An album data output unit 209 collects layouts on all the spreads created by the layout creating unit 208 and outputs them as album data.

The album displaying unit 210 creates album images based on the album data outputted from the album data output unit 209, and displays the album images on the display 105. The album images are, for example, image data in bitmap format in which the images are arranged according to a predetermined layout.

After the program of the album creating application in the present embodiment is installed into the image processing apparatus 100, an activation icon for this app is displayed on the top screen (desktop screen) of the operating system (OS) operating on the image processing apparatus 100. Once a user double-clicks on the activation icon on the desktop screen displayed on the display 105 using the mouse 107, the program for the album creating application stored in the HDD 104 is loaded into the RAM 103. Then, the CPU 101 executes the program loaded into the RAM 103, thereby activating the album creating application. This is the software configuration of the image processing apparatus of the present embodiment. The application may be in a different form, which is, for example, a web app displaying a screen and the like in a browser running on the image processing apparatus 100.

<GUI Screen>

Figure 5:
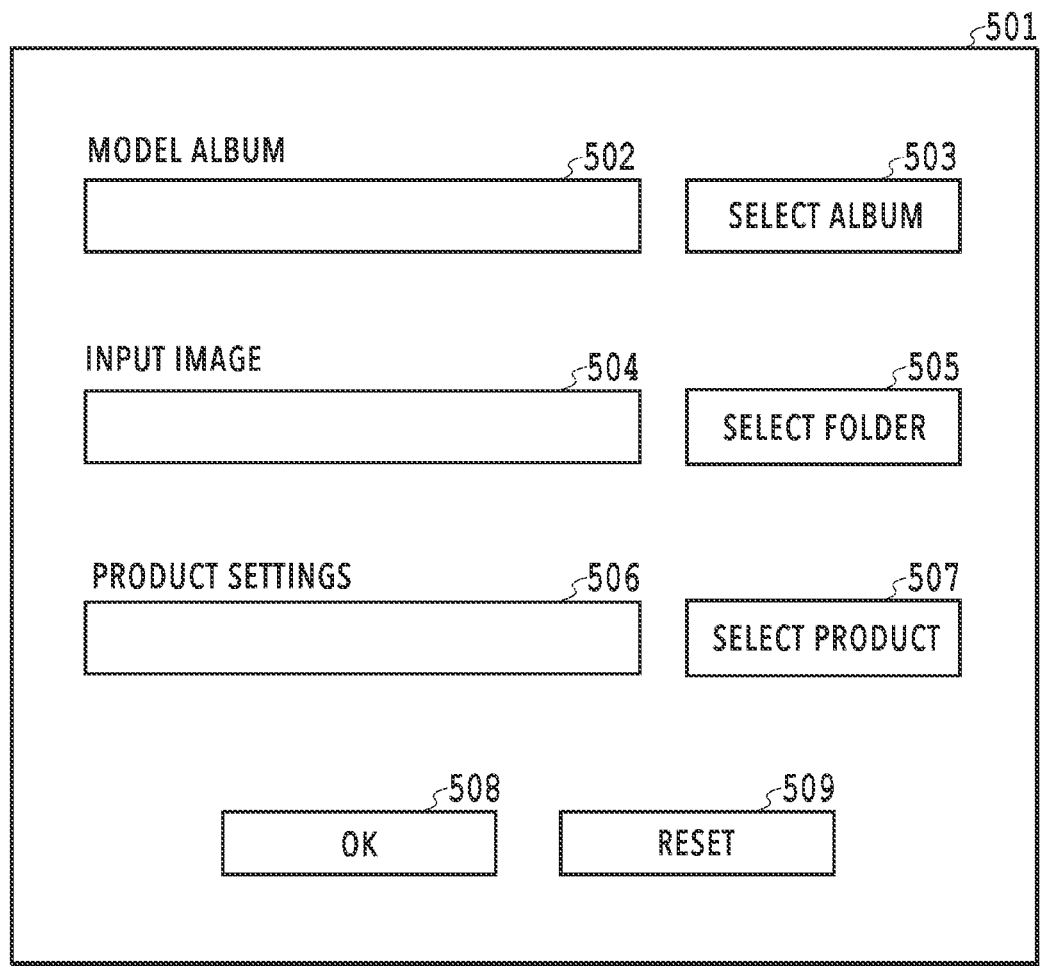
FIG. 5 is a diagram showing a GUI of an album creating application.

FIG. 5 is a diagram showing a GUI screen of the album creating application in the present embodiment. FIG. 5 shows a GUI screen 501 provided by the activated album creating application and displayed on the display 105. A user can set album creating conditions through the GUI screen 501.

As sections (items) for setting model album data, the GUI screen 501 has a model album path box 502 and a model album data selecting button 503. The model album path box 502 is a box for showing the location (i.e., the path to) where model album data is stored in the HDD 104. The model album data selecting button 503 is a button for selecting model album data. Once a user clicks on the model album data selecting button 503 with the mouse 107, a tree formed by a plurality of folders and files is displayed. Then, once the user selects a file retaining model album data, a file path to the selected file is displayed in the model album path box 502.

An input image path box 504 and an input image folder selecting button 505 are sections for setting picture images to include in an album. The input image path box 504 is a box for showing the location in (i.e., the path to) the HDD 104 where a group of images from which to select images used to create an album is stored. The input image folder selecting button 505 is a button for selecting a folder containing a group of images from which to select images used to create an album. Once a user clicks on the input image folder selecting button 505 with the mouse 107, a tree formed by a plurality of folders is displayed. Then, once a user selects a folder containing a group of images used to create an album, the folder path to the selected folder is displayed in the input image path box 504.

A product setting box 506 and a product selecting button 507 are sections for setting a product for an album to be created. The product setting box 506 is a box for showing information on a product for an album to be created, and after model album data is selected with the model album data selecting button 503, product information on the selected model album data is displayed in the product setting box 506. The product selecting button 507 is a button for switching products. Once a user clicks on the product selecting button 507 with the mouse 107, a list of products is displayed. Then, once a user selects a product, the selected product information is displayed in the product setting box 506.

An OK button 508 is a button for confirming the selected conditions as album creating conditions. Once a user clicks on the OK button 508 with the mouse 107, the album creating conditions are determined and are communicated to the automatic layout processing unit 201 via the album creating condition setting unit 202. More specifically, information on the path inputted in the model album path box 502 is communicated to the model album data obtaining unit 203, the path inputted in the input image path box 504 is communicated to the candidate image obtaining unit 205, and the product information inputted in the product setting box 506 is communicated to the album data output unit 209.

A reset button 509 is a button for resetting what is set on the displayed screen. This is the GUI screen of the album creating application in the present embodiment.

<Automatic Layout Processing>

Figure 6A:
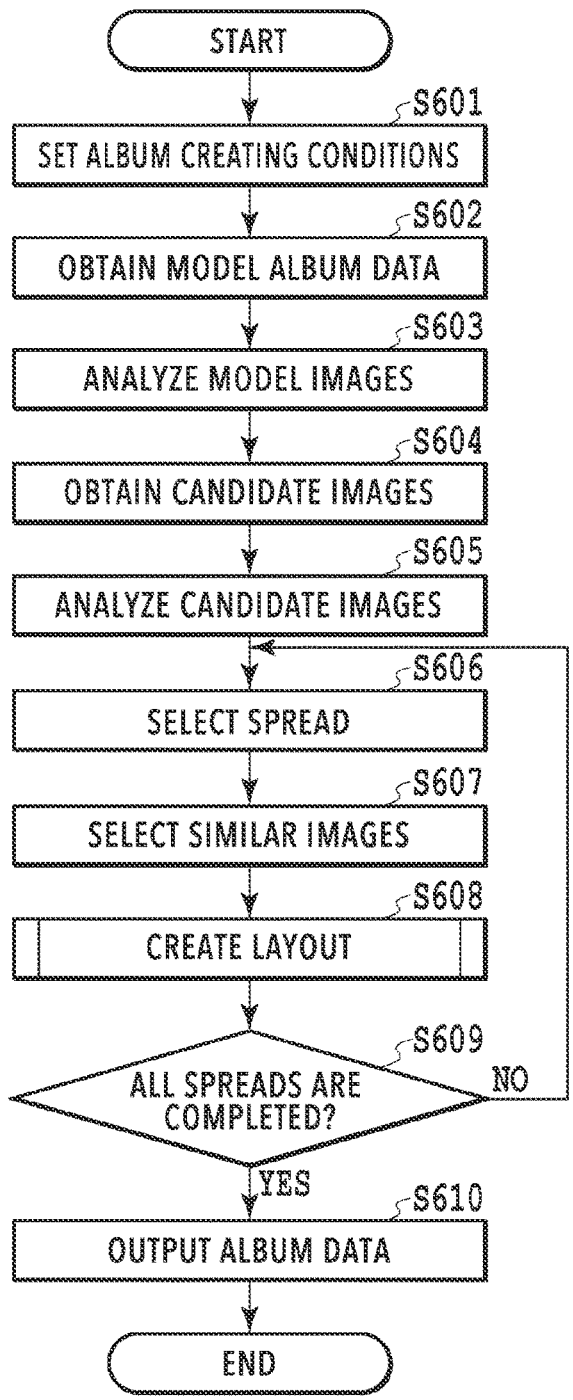
FIGS. 6A to 6C are flowcharts of automatic layout processing.
Figure 6B:
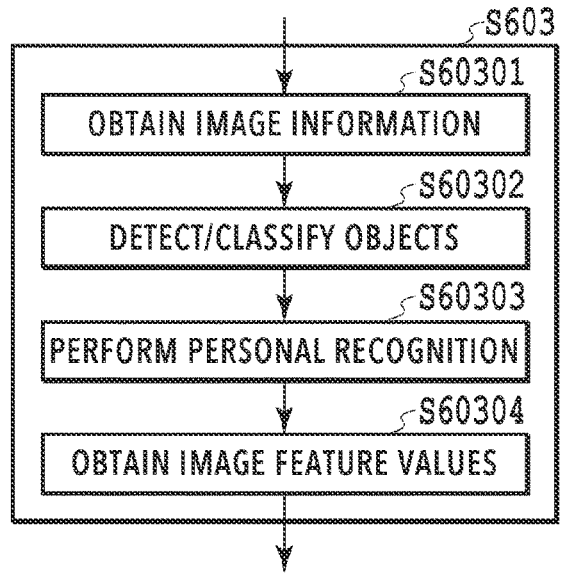
Figure 6C:
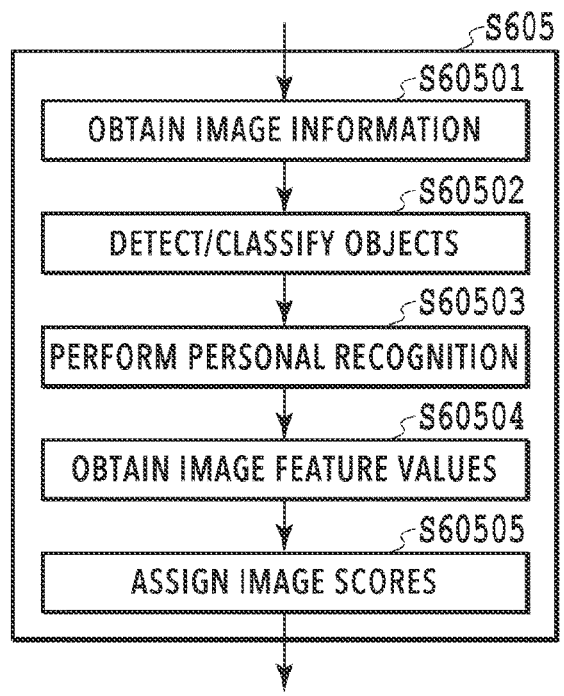

Automatic layout processing of the present embodiment is described below using FIGS. 6A to 6C. FIG. 6A is a flowchart of automatic layout processing of the album creating application according to the present embodiment. The flowcharts shown in FIGS. 6A to 6C are implemented by, for example, the CPU 101 loading the program stored in the HDD 104 into the ROM 102 or the RAM 103 and executing the program.

In Step 601, the album creating condition setting unit 202 sets album creating conditions. Hereinbelow, "Step" is abbreviated to S. In the present embodiment, model album data and a group of images to be used in an album are set in S601 as album creating conditions. Product information may additionally be set as the album creating conditions.

In S602, the model album data obtaining unit 203 reads the model album data set in S601, and loads the model album data into the RAM 103. The model album data obtaining unit 203 also reads image data from the HDD 104 using the image file path recorded in the model album data, and loads the image data into the RAM 103.

In S603, the model image analyzing unit 204 analyzes the model images loaded into the RAM 103 in S602. The image analysis performed in this step is now described using FIG. 6B.

In S60301, the model image analyzing unit 204 obtains information on the shooting date and time of each set of the image data obtained by the model album data obtaining unit 203. In the present embodiment, the information on the shooting date and time is obtained based on Exif information accompanying each set of image data.

In S60302, the model image analyzing unit 204 detects objects in the image data obtained by the model album data obtaining unit 203, and classifies the detected objects. In the present embodiment, faces are detected as objects. Any publicly known method may be employed for the face detection, and an example of such publicly known method is AdaBoost, which forms a strong classifier with multiple weak classifiers. In the present embodiment, a strong classifier formed by AdaBoost is used to detect the face of a person. The model image analyzing unit 204 detects a face in an image and obtains the coordinate values of the upper left point and the lower right point of the region of the detected face on the image. By detecting these two coordinate values, the model image analyzing unit 204 can identify the position and the size of the face. By using AdaBoost that detects animals such as dogs or cats and AdaBoost that detects dishes in the same way as the face of a person, the model image analyzing unit 204 can not only detect an object in an image, such as a person, an animal, and a dish, but also classify the object in the image to determine what the object is. Objects to be detected are not limited to the ones above, and may be a flower, a building, a figurine, or the like. Although AdaBoost is used to classify an object herein, image recognition may be performed using a pre-trained model such as a deep neural network.

In S60303, the model image analyzing unit 204 performs personal recognition on the face detected in S60302. First, the model image analyzing unit 204 derives a similarity between a face image extracted and a representative face image stored for each personal ID in a face dictionary database. Then, a personal ID whose similarity to the extracted face image is equal to or higher than a predetermined value and is the highest of all the personal IDs is determined as an ID corresponding to the extracted face image. In other words, the person with a personal ID whose similarity to the extracted face image is equal to or higher than a predetermined value and is the highest of all the personal IDs is identified as a person to which the face in the extracted face image belongs. In a case where the similarities derived for the personal IDs are all below the predetermined threshold, the person of the face image extracted is regarded as a new person, is given a new personal ID, and is registered in the face dictionary database. The face dictionary database is stored in, for example, the HDD 104.

In S60304, the model image analyzing unit 204 derives image feature values of the image data obtained by the model album data obtaining unit 203. Examples of the image feature value include color information. A histogram may be used as a method for using color information as an image feature value. Image data typically consists of pixels in each of which three RGB values are recorded. The model image analyzing unit 204 forms a histogram for each of the R values, B values, and G values of the entire image. A histogram can be formed by counting the frequency of appearance of a certain value within each range. For instance, in a case where pixel values are recorded from 0 to 255 and are counted in 16 bins (0 to 15, 16 to 31, ..., and 240 to 255), 48-dimensional feature values can be obtained (three values×16 ranges=48 dimensions). Note that the image feature value is not limited to this. For example, a deep neural network may be used for the feature value. Specifically, inputting an image into a network that performs object recognition yields an interim value in the process of computation in addition to the recognition results which are the type of the object and a numerical value indicating the probability thereof. Since the features of an image for recognizing of an object are concentrated in this interim value, the interim value can be used as a feature value indicating an image. The object detected in S60302 or the result of personal recognition in S60303 may be used as a feature value. For example, the number of people in an image may be used as a feature value, or the frequency of a person appearing in the entire group of images may be used as a feature value based on the result of personal recognition.

Although the model image analyzing unit 204 analyzes image data in the present embodiment, the present invention is not limited to this. For example, the analysis results obtained by the model image analyzing unit 204 may be stored in the HDD 104 as analysis information in advance. Then, the model image analyzing unit 204 may check whether analysis information on an image is stored in the HDD 104, and read the analysis information in a case where the analysis information is stored.

The analysis processing in S603 does not have to be executed every time. In other words, the processing in S603 is performed once for a single set of model album data, and the result of the processing is stored. Then, for the next time around, the model image analyzing unit 204 reads the result of the processing, and can thus obtain analysis information obtained by the analysis processing in S603.

Referring back to FIG. 6A, in S604, the candidate image obtaining unit 205 reads the group of candidate images set in S601 from the HDD 104, and loads them into the RAM 103.

In S605, the candidate image analyzing unit 206 analyzes the candidate images loaded into the RAM 103 in S604. The image analysis in this step is described using FIG. 6C. S60501 to S60504 are the same as S60301 to S60304 and are therefore not described in detail here.

In S60501, the candidate image analyzing unit 206 obtains information on the shooting date and time of each set of the image data obtained by the candidate image obtaining unit 205. In S60502, the candidate image analyzing unit 206 detects objects in the image data obtained by the candidate image obtaining unit 205, and classifies the detected objects. In S60503, the candidate image analyzing unit 206 performs personal recognition on the face detected in S60502. In S60504, the candidate image analyzing unit 206 derives image feature values of the image data obtained by the candidate image obtaining unit 205.

In S60505, the candidate image analyzing unit 206 assigns image scores to the group of candidate images obtained in the candidate image obtaining unit 205. An image score of an image indicates whether the image is suitable for the album, and is, for example, a focus level. The focus level may be determined using edge detection, for which a publicly known Sobel filter can be used. An edge in an image is detected with a Sobel filter, and the difference in luminance between the start and end points of the edge is divided by the distance between the start point and the end point. Thereby, a luminance gradient, i.e., the slope of the edge is calculated. The average of the slopes of edges in the image is calculated, and an image with a large average slope can be regarded as being in focus more than an image with a smaller average slope.

In the present embodiment, a plurality of thresholds are set for measuring the magnitude of the calculated average of the slopes of edges, and it is determined which of the thresholds the calculated average of the slopes of edges equals or exceeds. Thereby, it is determined whether the focus level is acceptable. Specifically, two different slope thresholds are set: a first threshold and a second threshold (where the first slope threshold >the second slope threshold). Then, the focus level is judged with good, fair, and poor. In a case where the average of the slopes of edges in an image equals or exceeds the first threshold, the focus level is determined as favorable (good). In a case where the average of the slopes of edges in an image is below the first threshold and equal to or above the second threshold, the focus level is determined as acceptable (fair), and in a case where the average of the slopes of edges in an image is below the second threshold, the focus level is determined as unacceptable (poor). This way, an image which is in focus can be given a high score. Although the focus level is used as a score indicative of image quality in the present embodiment, the present invention is not limited to this. For example, the image size, shooting information such as information on the lens used for the shooting, and a compression format for images inputted to the application may be used as a score indicative of image quality.

Beside the image quality, the score assignment may be based on the content in the image. For example, the face size derived in S60502 and the personal recognition result obtained in S60503 can be used. First, a person determined as appearing most frequently as a result of personal recognition is set as a main subject. An image with no main subject therein is given zero score, and images with the main subject therein are each given a score based on the proportion of the face of the individual set as the main subject relative to the image size. Although the face size is used for score assignment for each main subject in the present embodiment, the score assignment may be based on other than the face size. For example, an expression on a person which is the main subject is determined, and an additional point may be given in a case where the expression is a smile. In a case where the main subject is not a person, the score assignment may be performed similarly according to the object size by using the results of object detection and classification in S60503.

Referring back to FIG. 6A, in S606, the layout creating unit 208 selects the number of the spread for which to create a layout. In the present embodiment, the spreads are selected sequentially from spread number "0".

In S607, based on the analysis information on the model images obtained by the model image analyzing unit 204 and the analysis information on the candidate images obtained by the candidate image analyzing unit 206, the similar image selecting unit 207 selects candidate images (i.e., similar images) to place on the spread number selected in S606. First, the similar image selecting unit 207 in the present embodiment obtains, from among the analysis information on the model images obtained by the model image analyzing unit 204, the image feature value of the model image placed on the spread number selected in S606. In a case where a model template for the target spread number includes more than one slot, there are model images as many as the slots in the template, and the similar image selecting unit 207 obtains the image feature value of each of those model images.

Then, for each of the image features of the model images obtained, the similar image selecting unit 207 calculates the similarity between the image feature value of each of the candidate images and the image feature value of the model image. For example, the similarity can be calculated using the Euclidean distance between two feature values. The similar image selecting unit 207 selects a candidate image with the highest similarity as a similar image. To avoid the same candidate image being selected more than once, the candidate image selected once is excluded from the similarity calculation performed after that. Although a similar image is selected using image feature values in the present embodiment, the present invention is not limited to this. For example, the image score obtained by the candidate image analyzing unit 206 may be used. Specifically, for each model image feature value, top five image feature values of similar candidate images are selected, and the image with the highest image score of those candidate images may be selected as a similar image. In another example, the personal recognition results obtained by the model image analyzing unit 204 and the candidate image analyzing unit 206 may be used. For example, in a case where a model image has a main subject therein, a candidate image having no main subject therein is not selected as a similar image even in a case where the image feature similarity is high.

The similar image selecting unit 207 may also select a similar image using an image obtained by trimming one of the group of candidate images. For example, assume a case where the model image has two people side by side, and there is a candidate image in which two people are side by side with the same composition, but there is a tree in the background, so the candidate image is not selected as a similar image. In such a case, an image obtained by trimming the candidate image to include the region with the people is similar to the model image. Thus, such a trimmed image may be regarded as a similar image.

In S608, the layout creating unit 208 allocates the similar images selected in S607 to the model template. A layout creating method in the present embodiment is described using FIG. 7.

Figure 7:
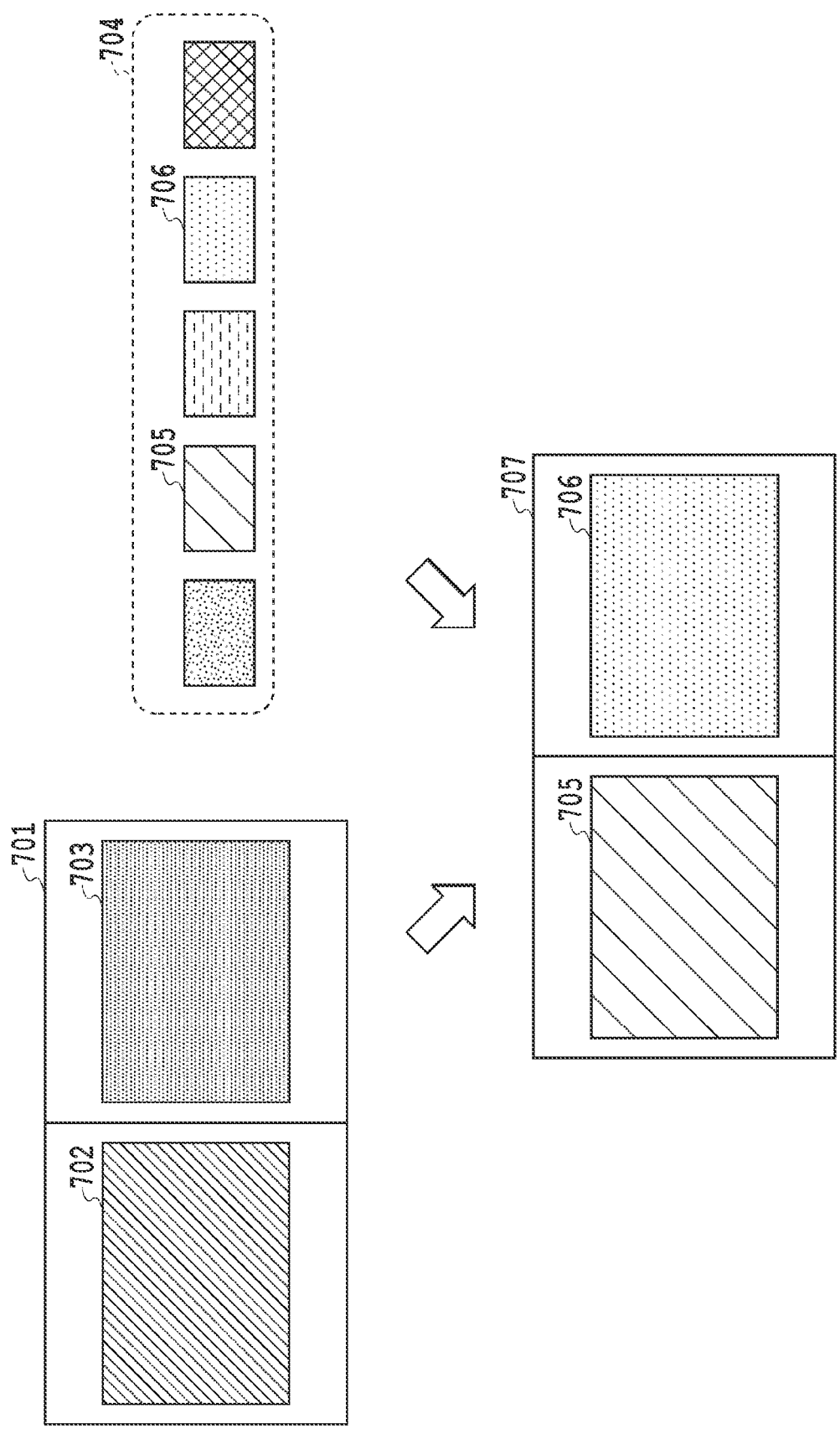
FIG. 7 is a diagram illustrating a layout creating method.

FIG. 7 shows an example of a model template on the target spread selected in S606 and an example of a layout created by the layout creating unit 208. The layout creating unit 208 first obtains a model template 701 for the target spread. The model template 701 is one of the model templates obtained by the model album data obtaining unit 203 that corresponds to the spread number selected and targeted in S606. Model images and their placement information are recorded in the model template 701. Model images 702 and 703 are images placed in the slots of the model template 701 and show their placement positions in the template. A candidate image group 704 shows the group of images obtained by the candidate image obtaining unit 205. Similar images 705 and 706 show the similar images selected in S607. The similar image 705 is an image similar to the model image 702, and the similar image 706 is an image similar to the model image 703. The layout creating unit 208 creates a layout by placing the similar images 705 and 706 at the same positions as the corresponding model images. A layout 707 is a layout thus created by the layout creating unit 208. A layout similar to the model template is thus created.

In the present embodiment, the layout creating processing in S608 includes a series of processing such as evaluating the layout created and changing the processing performed after that according to the evaluation results. Details of the layout creating processing in S608 will be given later.

In S609, the layout creating unit 208 determines whether the processing from S606 to S607 has been completed for all the spreads in the album data obtained by the model album data obtaining unit 203. If the determination result in this step is true, the processing proceeds to S610. If the determination result in this step is false, the processing proceeds back to S606.

In S610, the album data output unit 209 puts together the layouts of all the spreads created by the layout creating unit 208 and the product information set by the album creating condition setting unit 202 and outputs them as album data. The album data is, for example, in the format shown in FIGS. 3A and 3B, and is stored in the HDD 104.

This is the outline of the automatic layout processing of the present embodiment.

<Details of the Layout Processing>

Figure 8:
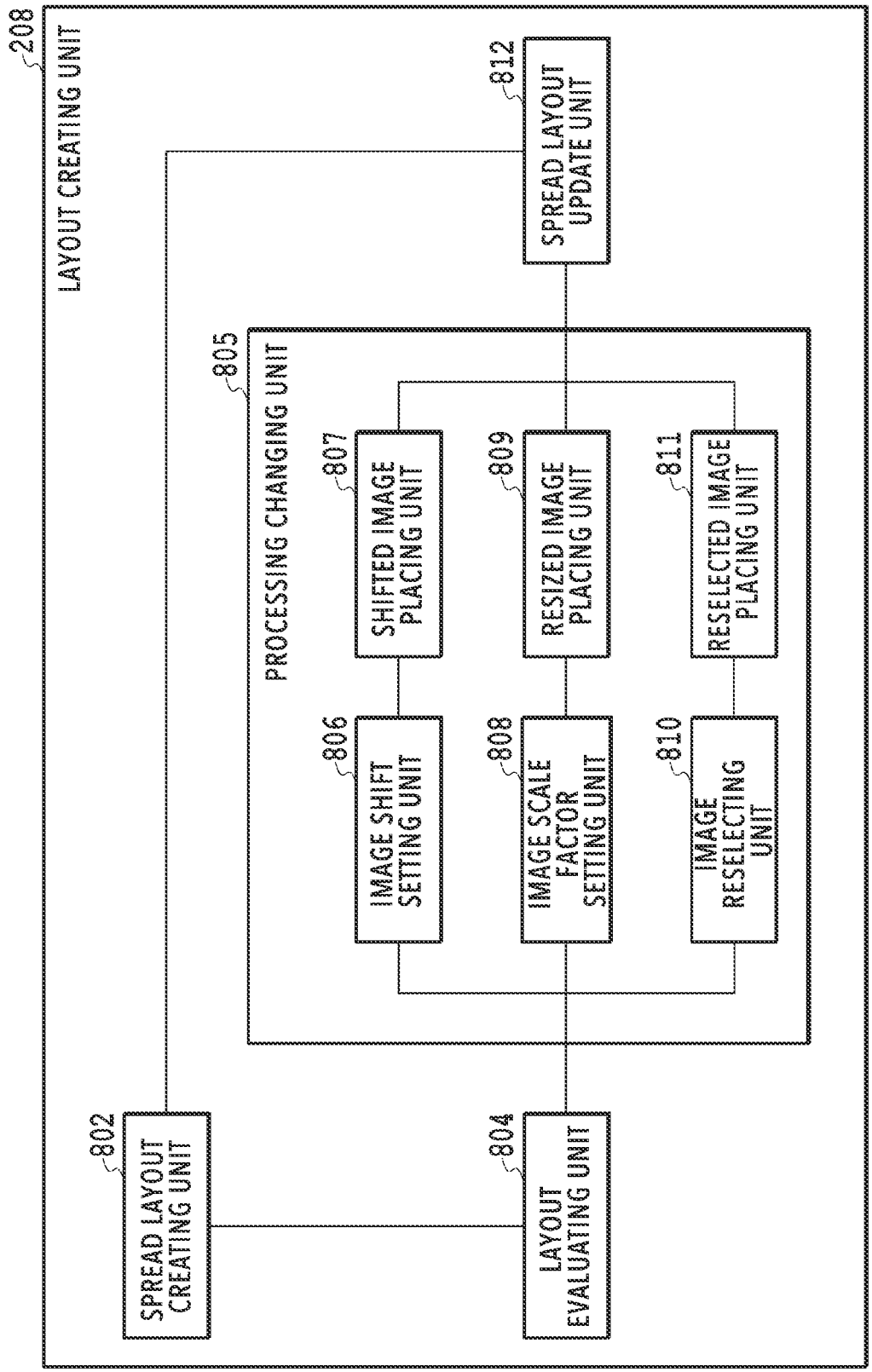
FIG. 8 is a diagram illustrating details of a layout creating unit.

FIG. 8 is a block diagram illustrating the details of the layout creating unit 208. The layout creating unit 208 includes a spread layout creating unit 802, a layout evaluating unit 804, a processing changing unit 805, and a spread layout update unit 812. The processing changing unit 805 includes an image shift setting unit 806, a shifted image placing unit 807, an image scale factor setting unit 808, a resized image placing unit 809, an image reselecting unit 810, and a reselected image placing unit 811.

The layout creating unit 208 of the present embodiment evaluates whether the layout created satisfies desired conditions. For example, an image similar to a model image may be edited to be placed into a model album's template. Consequently, the image may lose desired finished quality due to, for example, displacement in composition or difference in resolution between the similar image and the model image. The layout creating unit 208 of the present embodiment evaluates whether the created layout has desired finished quality, and changes the processing performed after that as needed. Details of the layout creating unit 208 are described below.

As already described, the layout creating unit 208 obtains album data from the model album data obtaining unit 203 and obtains similar images from the similar image selecting unit 207. The layout creating unit 208 also obtains analysis information on the model images from the model image analyzing unit 204 and obtains analysis information on candidate images from the candidate image analyzing unit 206.

The album data obtained from the model album data obtaining unit 203 is, as described earlier, data as shown in FIGS. 3A and 3B. As described earlier, FIG. 3A corresponds to product information. Product information includes the number of pages in an album to be created, the binding style of the product, the type of media, and the product size. In the present embodiment, one of two binding styles can be set as the binding style of the product: perfect binding and lay-flat binding. Settable product sizes include A4 portrait or landscape, A5 portrait or landscape, A6 portrait or landscape, and square. Settable media types include gloss paper, semigloss paper, and art paper. As described earlier, the album data obtained from the model album data obtaining unit 203 includes templates for the respective spreads in the model album. In this example, data stored in each template includes the number of slots, the positions of the slots, the angle of rotation, layer information, and frame embellishment information.

As described in connection to the layout creating unit 208 in FIG. 2 and S608 in FIG. 6A, the spread layout creating unit 802 creates a layout by placing selected similar images in the slots in the model template. The spread layout creating unit 802 may edit the similar images based on the model template. For example, in a case where the aspect ratio is different between a model image in a slot in the model template and a corresponding similar image or where a slot in the model template has an unusual shape, the spread layout creating unit 802 trims the similar image to fit the similar image into the slot. Also, in a case where a slot in the model template has a gradation mask or the like, the spread layout creating unit 802 applies a mask to the similar image to be placed so that the masking result will be the same as the model template.

The layout evaluating unit 804 evaluates the layout of the target spread created by the spread layout creating unit 802. The evaluation of a layout includes evaluating whether the finished quality of the album has a problem after the similar image is placed according to the model template. For example, the layout evaluating unit 804 evaluates whether the finished quality of the layout created is different from that of the model template, and in a case where they are different, the layout evaluating unit 804 can evaluate that the finished quality of the album created has a problem. The evaluation result may be outputted as an evaluation value indicative of whether the finished quality has a problem. The evaluation value may be prepared for each of the evaluation criteria to be described below. The following are the criteria for the evaluation of the finished quality of a layout.

One of the evaluation criteria is the resolution of an image. It is evaluated whether or not the resolution of a similar image placed in a slot equals or exceeds a predetermined value. In a case where the resolution is below the predetermined value, the layout evaluating unit 804 evaluates that the finished quality has a problem. The predetermined value can be set based on the resolution of the corresponding slot in the model template. Alternatively, the predetermined value may beset based on the average of the resolutions of all the slots in the model template including slots other than the target slot. Still alternatively, the predetermined value may be set based on the average of the resolutions of all the slots in the model album, i.e., the slots in the currently-used model template as well as the slots in the model templates on the other spreads.

Another possible evaluation criterion is whether the main subject is partially lost by trimming. In other words, the layout evaluating unit 804 evaluates whether the main subject region in a similar image placed in a target slot in the model template is partially lost by trimming. The layout evaluating unit 804 can identify a main subject region in a similar image based on the analysis information on the similar image obtained from the candidate image analyzing unit 206. In placing and trimming a similar image, the spread layout creating unit 802 may set a flag indicating whether the main subject region is cut by trimming. Then, the layout evaluating unit 804 may refer to the flag and determine whether the main subject is partially lost.

Another possible evaluation criterion is whether the main subject is blocked (partially lost) by an overlapping slot. In some model templates, a first slot may be placed over a second slot in an overlapping manner. In other words, the layer of the first slot may be placed on top of the layer of the second slot. In this case, in the overlap region, the image in the first slot is displayed or printed, and therefore a region of the second slot overlapping with the first slot is blocked (or partially lost). In a case where the model template has overlapping slots, the layout evaluating unit 804 determines whether the main subject region in a similar image is blocked due to the order of the layers of the slots. As described earlier, the layout evaluating unit 804 can identify a main subject region in a similar image based on the analysis information on the similar image obtained from the candidate image analyzing unit 206. Also, in placing a similar image, the spread layout creating unit 802 may set a flag indicating whether the main subject region is blocked by another overlapping slot. Then, the layout evaluating unit 804 may refer to the flag and determine whether the main subject is blocked.

The evaluation criteria are not limited to the above examples. For example, the layout evaluating unit 804 may evaluate whether there is a mask superimposed on the main subject region. The layout evaluating unit 804 may also use product-related criteria as the evaluation criteria. For example, in a case where the main subject region overlaps with the binding portion of the album, the layout evaluating unit 804 may evaluate that the finished quality has a problem in a case of perfect binding, and that the finished quality does not have a problem in a case of lay-flat binding.

In a case where the layout evaluating unit 804 evaluates that the finished quality of a layout has a problem, the processing changing unit 805 changes processing performed after that according to the determination factor based on which the evaluation has been made, to make an adjustment to the target slot (such processing is hereinafter referred to as adjustment processing). Examples of the adjustment processing of the present embodiment include shifting the position of the image placed in the slot, changing the scale factor of the image in the slot, and changing the selected similar image to a different similar image. For the sake of description, it is assumed here that the adjustment processing is preset as follows for each determination factor. In a case where a main subject region is partially lost by trimming, processing is performed to shift the image placed in the target slot. Ina case where the resolution of the similar image placed in the target slot is not high enough, processing is performed to change the scale factor of the similar image. In a case where the main subject region is blocked by an overlapping slot or the like, processing is performed to change the selected similar image to a different image. In the following, a description is given for each of these kinds of processing performed by the processing changing unit 805. Note that the processing changing unit 805 targets and processes a slot for which the layout evaluating unit 804 has evaluated that the finished quality of the layout has a problem.

The image shift setting unit 806 sets the shift amount (movement amount) and the shift direction (movement direction) for a similar image in the target slot based on the model template and the analysis information on the similar image. Specifically, first, based on the analysis information on the similar image to be placed in the target slot, the image shift setting unit 806 identifies a main subject region included in the similar image. For simplicity of description, it is assumed here that there is only one main subject region in the image. The image shift setting unit 806 identifies a region where the main subject region is partially lost by the similar image's being trimmed to be placed into the target slot. For simplicity of description, it is assumed here that the identified region is rectangular. The image shift setting unit 806 sets the shift direction to a direction exactly opposite from the identified region. The image shift setting unit 806 also sets the shift amount to the lengths of the vertical side and the horizontal side of the rectangular region to be lost by trimming. The image shift setting unit 806 thus sets the shift amount and the shift direction for the similar image. The image shift setting unit 806 may search for all the directions in which the loss is avoidable, and set a final shift direction to a direction which minimizes the shift amount.

Based on the shift direction and the shift amount set by the image shift setting unit 806, the shifted image placing unit 807 performs shift processing on the similar image to be placed in the target slot.

Next, the image scale factor setting unit 808 is described. Based on the model template and the analysis information on the similar image, the image scale factor setting unit 808 sets a scale factor (or a resizing factor) for the similar image in the target slot. For example, in a case where the resolution of the similar image placed in the target slot is below a predetermined value, the image scale factor setting unit 808 changes the resizing factor of the similar image to be placed. For example, assume a case where a similar image is placed in a target slot with a first scale-up factor, and then the resolution of the similar image falls below a predetermined value. Then, the image scale factor setting unit 808 sets the scale-up/down factor so that the similar image may be placed with a second scale-up factor which is smaller than the first scale-up factor.

In this way, the image scale factor setting unit 808 first obtains the resolution of a similar image placed in the target slot. The image scale factor setting unit 808 also obtains a resolution acceptable for the target slot (a predetermined resolution). Then, the image scale factor setting unit 808 changes the scale-up/down factor for the similar image to be placed so that the resolution of the similar image to be placed may equal or exceed the predetermined resolution.

As described earlier, a similar image may be an image obtained by trimming a candidate image. The trimming may result in a lower resolution, and the image scale factor setting unit 808 performs similar processing in such a case as well. The following describes a specific example.

Figure 9:
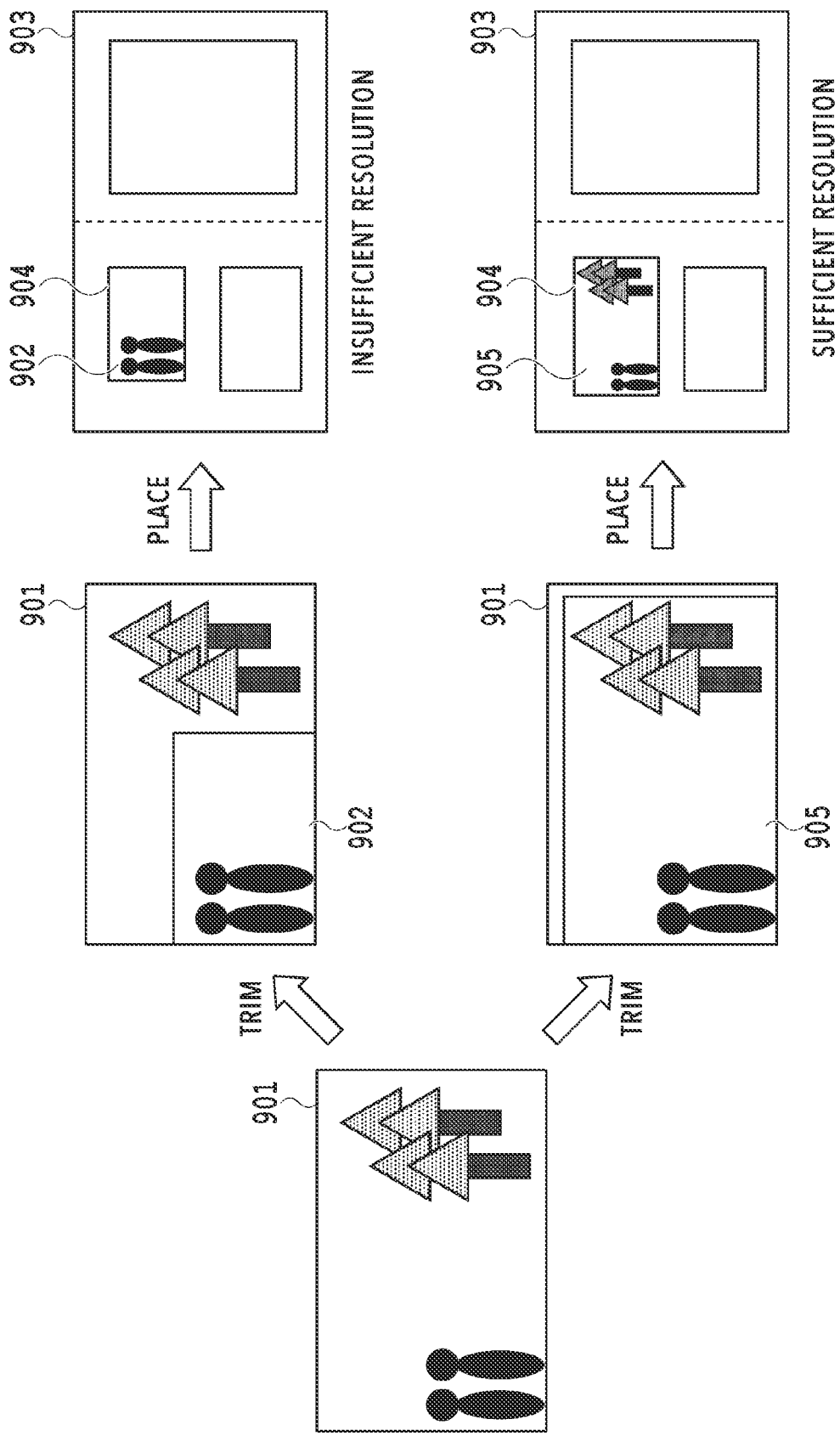
FIG. 9 is a diagram illustrating an example of how a similar image is obtained by trimming of a candidate image.

FIG. 9 is a diagram illustrating an example where a similar image is obtained as a result of trimming a candidate image. In a case where a similar image similar to a model image placed in a slot 904 in a model template 903 is not found in a group of candidate images, an image obtained by trimming one of the group of candidate images is used as a similar image. A trimmed image may include information indicating the image has been trimmed.

In this example, an image 902 obtained by trimming a candidate image 901 is similar to a model image placed in the slot 904. In this case, the image 902 is placed in the slot 904. Now, assume that the image scale factor setting unit 808 determines that the resolution of the image 902 placed in the slot 904 is below a predetermined value. Then, the processing changing unit 805 places an image 905 which corresponds to the untrimmed candidate image 901 into the slot 904. In other words, in a case where the resolution falls below a predetermined value as a result of trimming, resolution is prioritized over similarity, and an untrimmed candidate image is used and placed. The present invention is not limited to the above-described example where one of the group of candidate images is trimmed in a case where a similar image similar to the model image placed in the slot 904 in the model template 903 is not found in the group of candidate images. The group of candidate images may originally include images obtained by trimming candidate images.

The desired resolution (predetermined value) used by the image scale factor setting unit 808 in setting the scale-up/down factor can be set to the smallest one of the resolutions of the images placed in the model template on the target spread. Alternatively, the limit value (the upper limit) of the resolution may be set, and in a case where the resolution of the similar image exceeds the limit value, the shift processing may be performed, or a different image may be used. The resolution limit value may be changed depending on the printer to use or depending on the media type to use to create the album. For example, the resolution limit value may be raised for gloss paper to impose a restriction so that the resolution may not fall below the predetermined value, and may be lowered for semigloss paper compared to gloss paper. A specific example is described. Assume that the desired resolution (predetermined value) of a target slot is 144 dpi, and the resolution limit value for the printer to use is 72 dpi. Then, in a case where the media type used for creating an album is gloss paper, the resolution limit value is raised from 72 dpi to 350 dpi. Thereby, a restriction is imposed so that the resolution may not fall to or below the predetermined value (144 dpi). In other words, even in a case where an image scaled up or down has a resolution satisfying the desired resolution for the target slot (144 dpi), a fine image resolution is required for, for example, gloss paper. Thus, a limit value may be provided so that only an image with a resolution of 350 dpi can be placed in the target slot even in a case where the image exceeds the limit value of the printer (72 dpi) and exceeds the desired resolution (predetermined value) of the target slot (144 dpi).

Also, the resolution limit value may be raised for a A4-size product to impose a restriction so that the resolution may not fall to or below the limit value, and may be lowered for a A6-size product compared to a A4-size product. This is because a finer resolution is required for A4-size paper. Also, the upper and lower limits of the predetermined resolution, the minimum image width, the minimum image height, and the like may be set based on the model layout.

In addition, in scaling down a similar image, the image scale factor setting unit 808 may cancel processing based on the main subject region. For example, in a case where the resolution of the main subject region does not reach the predetermined resolution, the image scale factor setting unit 808 may set the scale-up/down factor so as to scale down the image to the predetermined resolution.

The resized image placing unit 809 performs resizing processing on an image in a target slot based on the resizing factor set by the image scale factor setting unit 808. Since the resized image placing unit 809 performs the processing according to the resizing factor set by the image scale factor setting unit 808, the resized image placed by the resized image placing unit 809 may be in size different from the size of the target slot. In a case where the resized image placed in the target slot ends up being smaller than the size of the target slot, the gap between the image and the target slot is embedded with the background color of the album.

Next, the image reselecting unit 810 is described. The image reselecting unit 810 searches the group of candidate images for an image different from the image specified as a similar image to be used in the target slot. This image search is performed based on the analysis information like in the selecting processing performed by the similar image selecting unit 207. A similar image originally selected as a similar image to be used in the target slot is referred to as a first similar image here. The image reselecting unit 810 searches the group of candidate images for an image with a high similarity to the first similar image. This search can use, for example, the similarity between the feature values of images and main subject regions in the images, both of which are included in the analysis information. For example, from the group of candidate images, the image reselecting unit 810 first extracts a group of images each having a main subject region located outside a slot overlap region as a result of being placed in the target slot. Then, from the extracted group of images, the image reselecting unit 810 selects an image whose similarity to the first similar image is the highest, as a second similar image.

The search may be performed not on all the candidate images, but on a limited range of candidate images. For example, the range may be limited using information on the shooting date and time of the candidate images. Specifically, the image reselecting unit 810 searches the group of candidate images for a group of images taken in the same period of time as the first similar image. A group of images taken in the same period of time may be, for example, a group of images shot continuously at the same timing as the first similar image. In a case where there is no image satisfying the conditions in this period of time, the period of time of shooting to search for may be expanded to the same scene as the similar image. The "scene" here means a collection of images grouped based on their analysis information (a sub-group of images). For example, two images shot at different times are determined as having been shot in the same scene in a case where the difference between the shooting times is equal to or below a predetermined threshold, or in a case where the images have the same person or background therein. Scene determination results may be included in the analysis information obtained by the candidate image analyzing unit 206, and the image reselecting unit 810 may use the scene determination results. Alternatively, the image reselecting unit 810 itself may make the scene determination. In a case where there is no image satisfying the conditions within the same scene, the shooting period of time to search for may be expanded to a period set according to another similar image used on the same spread as the first similar image. Changing the search range according to the shooting properties in this way can shorten the time it takes to do the image search.

In a case where a second similar image satisfying the conditions is found, the image reselecting unit 810 checks the similarity between the second similar image and each of the other similar images used in slots other than the target slot. The image reselecting unit 810 can check the similarity between the second similar image and each of the other similar images used in the slots in the target template as well as the similar images used in the slots on all the spreads. In a case where the second similar image is similar to none of the similar images used in the other slots, the image reselecting unit 810 determines the second similar image as a reselected image. In a case where the second similar image is similar to any of the other similar images, the image reselecting unit 810 unselects the second similar image, and searches for another image again. Selecting a reselected image in this way can avoid a situation where the finished quality of the layout is consequently lowered because a similar image that looks like any of the images in the other slots is chosen as a result of changing the similar image to one that satisfies the conditions.

A lower limit may be set for the similarity between the second similar image and the corresponding model image. Then, once the similarity falls below the lower limit, the image changing processing may be terminated. In this case, the processing may be switched to the image shifting processing or resizing processing. For example, as described earlier, a first similar image may be trimmed to a predetermined range, and the trimmed image may be subjected to image shifting processing or resizing processing. In this way, in a case where an image similar to the model image is not found, the first similar image is continued to be used, which can help prevent degradation of the finished quality of the layout due to the layout coming out differently from the model layout. The lower limit may be set based on the average, the maximum value, or the minimum value of the similarities between similar images used in the slots other than the target slot and their corresponding model images. The lower limit may also be set based on the similarities between similar images used in the other slots in the target template and their corresponding model images. The lower limit may also be changed according to the search section. For example, in a case of a group of images continuously shot at the same timing as the first similar image, the lower limit is set to be lower than a first value. Then, to expand the search section to a period set according to another similar image used on the same spread as the first similar image, the lower limit is set to be higher than the first value. The lower limit may be changed in this way.

The reselected image placing unit 811 replaces the first similar image placed in the target slot with the second similar image selected by the image reselecting unit 810.

The spread layout update unit 812 reflects the results of changes made by the adjustment processing performed by the shifted image placing unit 807, the resized image placing unit 809, or the reselected image placing unit 811 into the layout created by the spread layout creating unit 802 and thereby updates the layout. This is the description of the detailed configuration of the layout creating unit 208.

Figure 10:
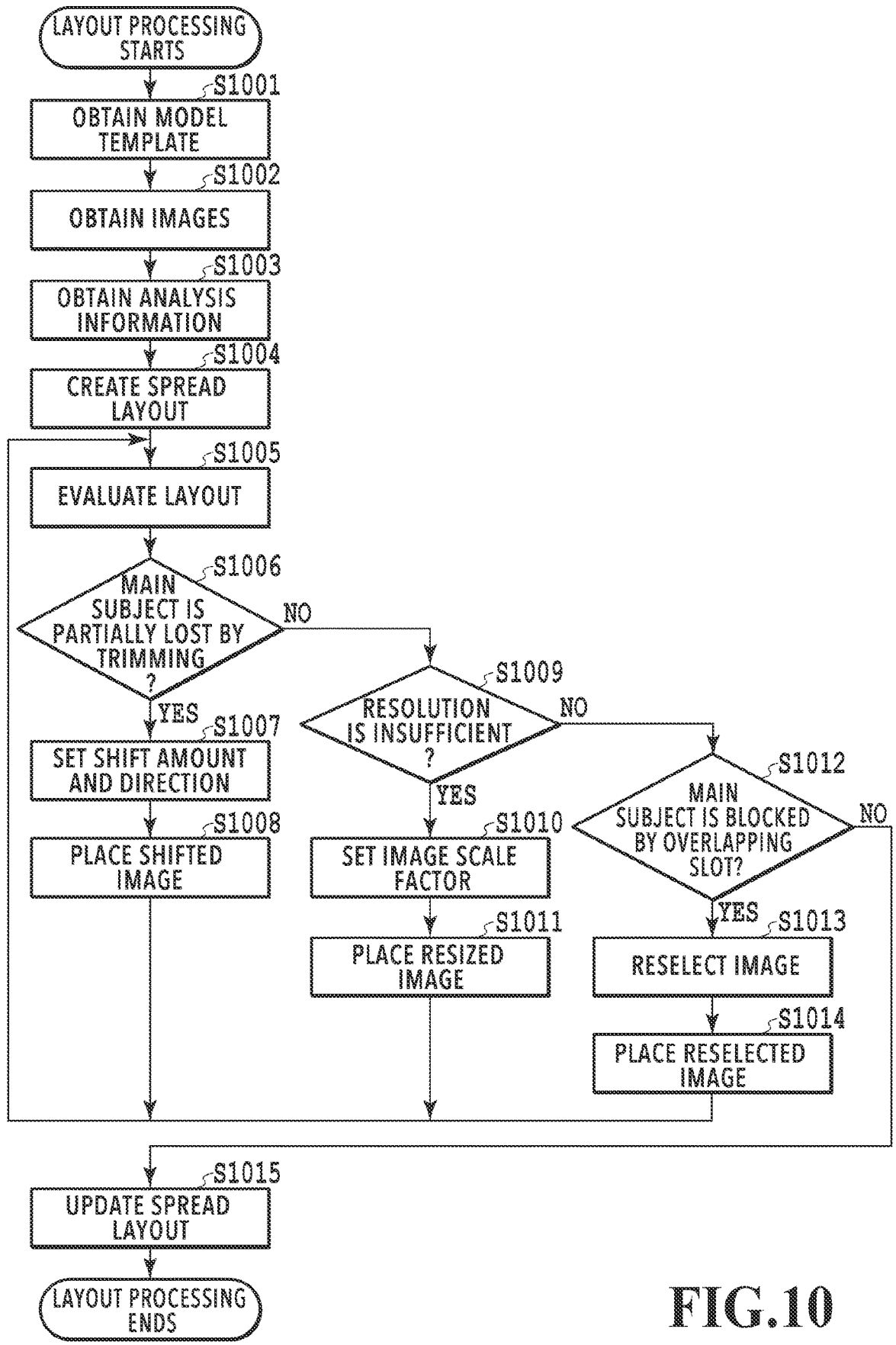
FIG. 10 is a flowchart illustrating details of the layout creating method.

FIG. 10 is a flowchart showing the details of the layout creating processing in S608 in FIG. 6A. As shown in FIG. 6A, the processing in FIG. 10 is performed for each target spread. In S1001, the spread layout creating unit 802 obtains an album template for the target spread. In S1002, the spread layout creating unit 802 obtains model images in the album template, similar images, and candidate images. In S1003, the spread layout creating unit 802 obtains analysis information on the model images, analysis information on the similar images, and analysis information on the candidate images. The candidate images and the analysis results on the candidate images may be obtained only in a case where the layout evaluation to be described later determines that the finished quality has a problem. In S1004, the spread layout creating unit 802 creates a layout of the target spread as depicted in S608.

In S1005, the layout evaluating unit 804 evaluates the layout created in S1004. Specifically, the layout evaluating unit 804 evaluates whether the layout created in S1004 has desired finished quality. In a case where the target spread includes more than one slot, the evaluation processing is performed on each slot as a target slot.

In S1006, the layout evaluating unit 804 determines whether trimming causes partial loss of the main subject region. In a case w % here the main subject region is partially lost, the finished quality has a problem; thus, the processing proceeds to S1007. In a case where the main subject region is not partially lost, the processing proceeds to S1009.

In S1007, the image shift setting unit 806 sets a shift direction and a shift amount for the similar image. Then, in S1008, the shifted image placing unit 807 shifts the position of the image in the target slot based on the shift direction and the shift amount set in S1007. The processing then proceeds to S1005.

In S1009, the layout evaluating unit 804 determines whether or not the resolution of the image placed in the target slot equals or exceeds a predetermined value, and switches processing performed after that based on the determination result. In a case where the resolution is below a predetermined value, the resolution is insufficient, and the finished quality may have a problem; thus, the processing proceeds to S1010. In a case where the resolution equals or exceeds the predetermined value, the resolution is not insufficient; thus, the processing proceeds to S1012.

In S1010, the image scale factor setting unit 808 sets the resizing factor of the similar image placed in the target slot. As described earlier, the image scale factor setting unit 808 changes the resizing factor of the similar image so that the similar image placed in the same slot as that in the model template satisfies the predetermined resolution. Then, in S1011, the resized image placing unit 809 performs resizing processing on the similar image to be placed in the target slot based on the resizing factor set in S1010, and then the processing proceeds back to S1005.

In S1012, the layout evaluating unit 804 determines whether an overlap between slots in the layout, if any, blocks the main subject region included in the image on the lower layer, and switches processing performed after that depending on the determination result. In a case where the main subject region is blocked, the finished quality has a problem: thus, the processing proceeds to S1013. In a case where the main subject region is not blocked, the finished quality does not have a problem; thus, the processing proceeds back to S1015. In S1012, in addition to the determination about an overlap between slots, it may be determined based on product information whether the main subject overlaps with the binding portion.

In S1013, the image reselecting unit 810 reselects an image to replace the similar image used in the target slot from other candidate images. In S1014, the reselected image placing unit 811 places the image reselected in S1014 in the target slot as a new similar image. The processing then proceeds back to S1005.

After the above various kinds of adjustment processing are performed, the processing proceeds back to S1005 where an evaluation is made again whether the finished quality of the changed layout does not have a problem. As described earlier, various restrictions such as a lower limit may be imposed by the adjustment processing, and in a case where an image does not fall within a restriction imposed by certain adjustment processing, different adjustment processing may be performed.

In S1015, based on the result of the adjustment processing performed, the spread layout update unit 812 updates the layout of the target spread. In a case where the layout evaluation determines that no adjustment processing is necessary, the update processing in S1015 may be skipped.

As described above, according to the present embodiment, even in a case where an image similar to a model image is edited to be placed into a template of a model album according to the model album, a layout with desired finished quality can be created.

Second Embodiment

In the example described in the first embodiment, after placing a similar image in a slot, the layout creating unit 208 performs adjustment processing on the similar image such as changing the resizing factor of the image, shifting the image, or placing a different image. In an example described in the present embodiment, in a case where an embellishment is added to a slot in a model template and hinders creation of a layout with desired finished quality, processing is performed to change the embellishment.

Figure 11:
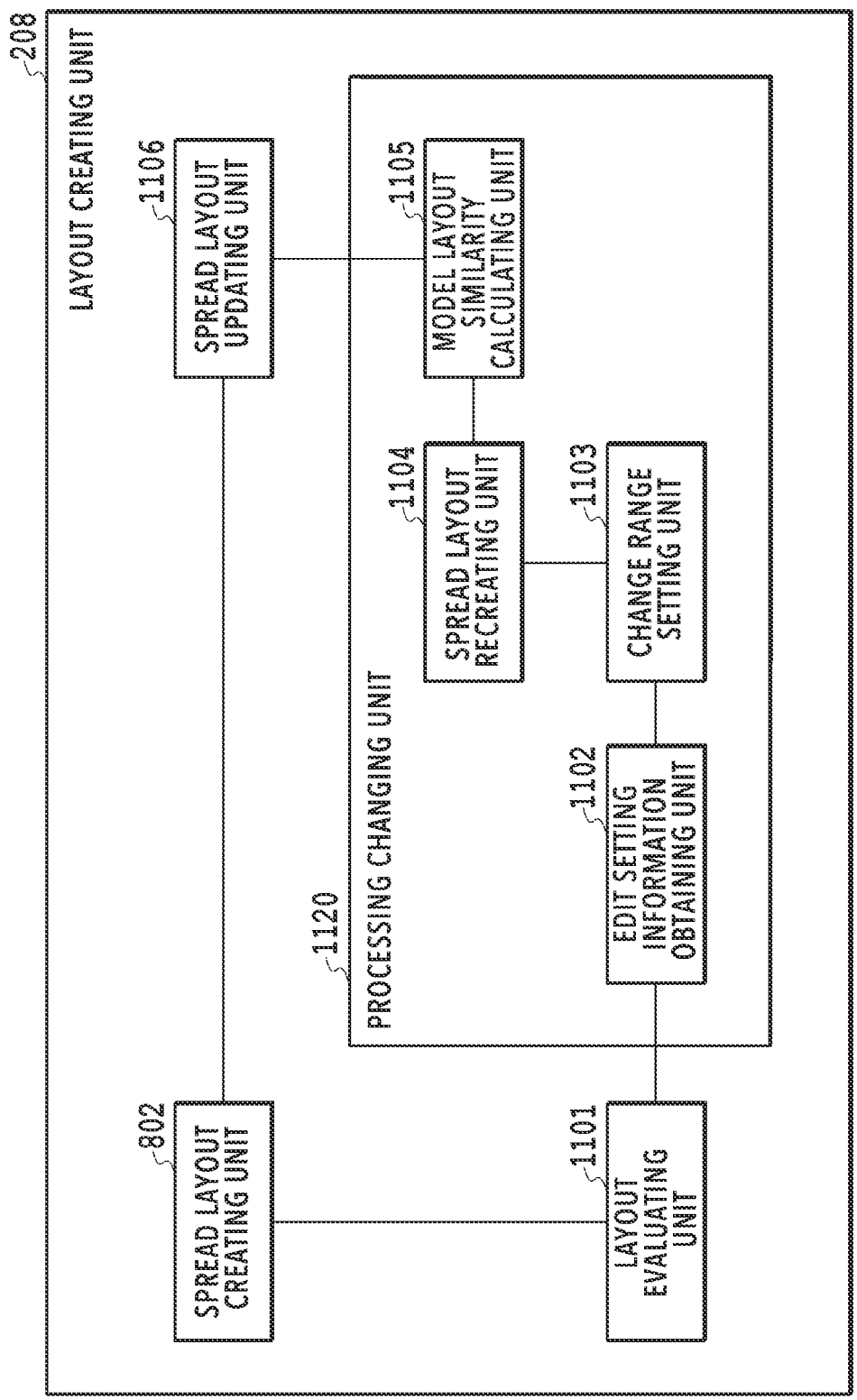
FIG. 11 is a diagram illustrating details of the layout creating unit.

FIG. 11 is a block diagram showing the details of the layout creating unit 208 of the present embodiment. The layout creating unit 208 of the present embodiment has the spread layout creating unit 802, a layout evaluating unit 1101, a processing changing unit 1120, and a spread layout updating unit 1106. The processing changing unit 1120 has an edit setting information obtaining unit 1102, a change range setting unit 1103, a spread layout recreating unit 1104, and a spread layout similarity calculating unit 1105. Since the spread layout creating unit 802 performs the same processing as that in the first embodiment, the description thereof is omitted.

The layout evaluating unit 1101 evaluates whether the main subject region is blocked by a frame embellishment applied to the target slot. A frame embellishment is what embellishes the frame of a slot. The embellishment is selected and set from variations prepared in advance. The embellishment variations include the line type, thickness, and color of the frame line of a slot, shadow added to the slot, a rectangular or oval frame which looks like a picture frame, and the like. A model template may include such embellishment designs for the slots. The evaluation may also be made based on criteria other than the blocking of a main subject region.

The edit setting information obtaining unit 1102 obtains information on the frame embellishment added to the target slot in the model template. For simplicity of description, it is assumed here that a rectangular frame design is used as the frame embellishment for the target slot.

Based on the settings of the frame embellishment obtained by the edit setting information obtaining unit 1102, the change range setting unit 1103 sets a change range for the layouts created by the spread layout recreating unit 1104 to be described later. In the present embodiment, processing is performed to actually recreate layouts each with a different embellishment design, and an embellishment design to actually apply to the layout is determined based on the similarity between each recreated layout and the model template. The change range set by the change range setting unit 1103 includes the types (numbers) of embellishment designs to which the current frame embellishment may be changed. In the present embodiment, for the sake of description, the following five designs are set as the change range: two designs which are of the same style as but in different frame line widths from the frame embellishment used for the target slot, and three designs which are of the same style as not the one used for the target slot but the one used for a different slot on the same spread and are in different sizes from one another.

Figure 12:
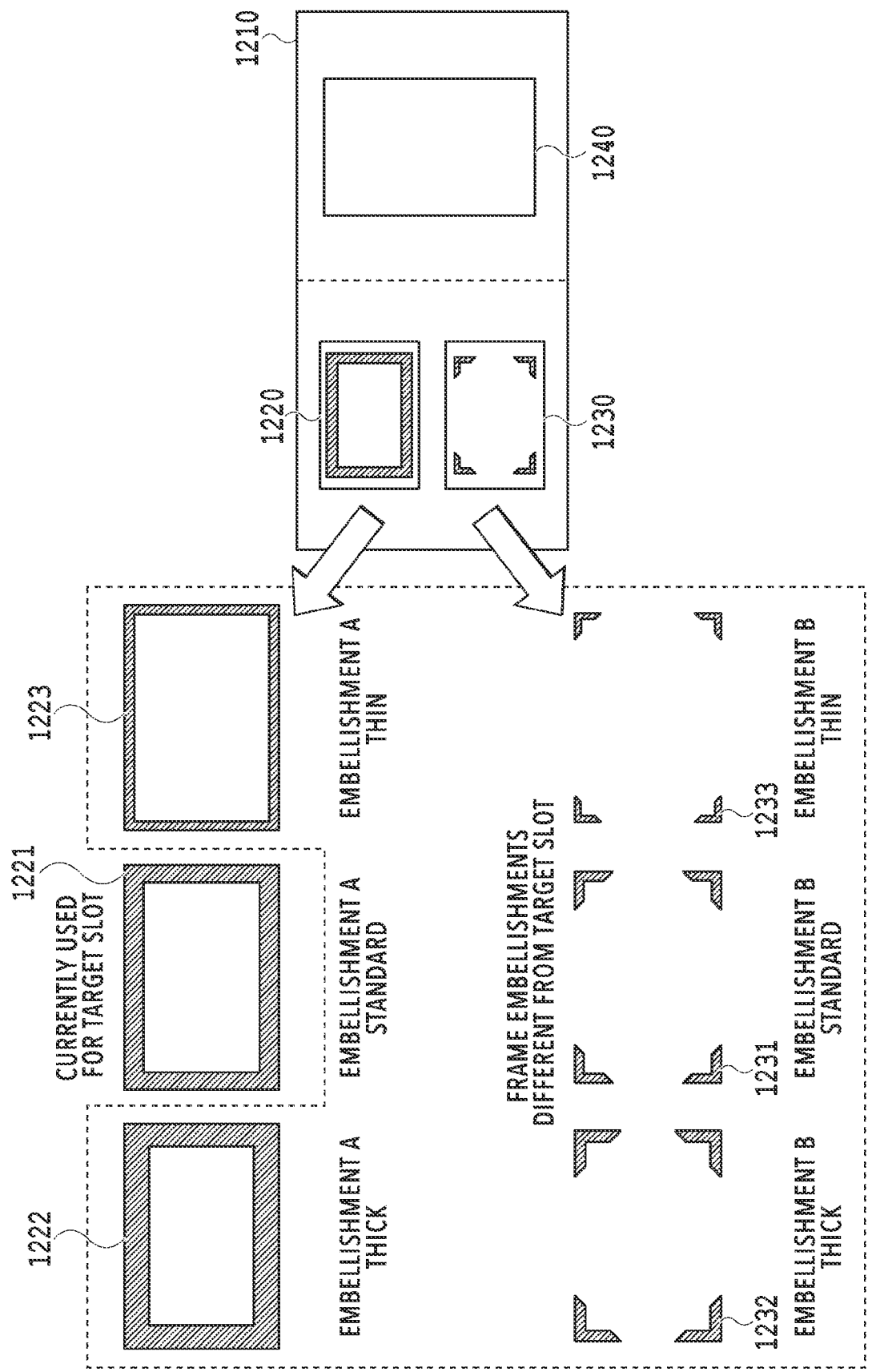
FIG. 12 is a diagram showing example embellishment designs.

FIG. 12 is a diagram showing example embellishment designs. A model template 1210 includes slots 1220, 1230, and 1240. Assume that the slot 1220 is a target slot. The slot 1230 has a frame embellishment different from that applied to the slot 1220. The slot 1240 has no frame embellishment. A design 1221 is used for the slot 1220. A design 1222 and a design 1223 are different from the design 1221 in their line widths. Designs 1231 to 1233 are three embellishment designs which are of the same style as the one used for the slot 1230 on the same spread but in different line widths. The change range setting unit 1103 thus sets five embellishment designs as embellishment design types of the change range.

Although the frame embellishments set to the change range here are ones used for the slots on the same spread as the target slot in the model template, they may be set using a different method. For example, frame embellishments used for the slots on other spreads in the model template may be added to the change range. Also, frame embellishments determined as being frequently used based on an album creation history may be set to the change range. Also, based on the design of the frame embellishment added to the target slot, the change range for the frame embellishment may be set in advance, and the preset change range may be used in a case where the frame embellishment is changed. Alternatively, a feature value of the frame embellishment used for the target slot and feature values of frame embellishments retained in the app are extracted, their similarities are calculated, and frame embellishments with similarities equal to or above a predetermined threshold may be set to the change range.

The spread layout recreating unit 1104 creates layouts using the frame embellishments in the change range thus set. Specifically, the spread layout recreating unit 1104 creates layouts as many as the frame embellishments set by the change range setting unit 1103. In creating the layouts, the spread layout recreating unit 1104 determines whether the main subject region is blocked by a frame embellishment, and excludes the layout in which the main subject region is blocked by the frame embellishment. For the sake of description, in the example described above, it is determined whether the main subject region is blocked by a frame embellishment, but the evaluation may be made based on other criteria, such as whether the frame embellishment overlaps with the binding portion of the album.

In changing the frame embellishment for the target slot, in a case where a frame having the same embellishment as the one originally applied to the frame of the target slot is used on the same spread or in the same album, that frame is also changed like the target frame. Alternatively, the changing of the frame embellishment may be performed only on the slots in which candidate images in the same scene are placed. This consequently can bring a unified look to the layout on each spread.

The spread layout similarity calculating unit 1105 calculates the similarity between each of the layouts created by the spread layout recreating unit 1104 and the model template on the target spread. Preview images of the recreated layouts may be used for this similarity determination. For example, the spread layout similarity calculating unit 1105 creates a preview image based on a layout recreated by the spread layout recreating unit 1104. Similarly, the spread layout similarity calculating unit 1105 creates a preview image of the model template. Then, the spread layout similarity calculating unit 1105 calculates the similarity between the preview images thus created. For the similarity calculation, the feature values of the preview images created may be extracted as vectors, and the inner product of the feature value vectors may be used. Then, it may be determined as a result of the calculation that the higher the similarity, the more similar the layout is. The spread layout similarity calculating unit 1105 performs this similarity calculation on all the layouts recreated by the spread layout recreating unit 1104.

The present invention is not limited to the above-described example where the spread layout similarity calculating unit 1105 determines the similarity between the preview image of the layout recreated by the spread layout recreating unit 1104 and the preview image of the model template. For example, the spread layout similarity calculating unit 1105 may create preview images of the layouts before and after changing the frame embellishment of the target slot, and calculate the similarity therebetween.

The spread layout updating unit 1106 determines the layout with the highest similarity calculated by the spread layout similarity calculating unit 1105 as the final layout. The spread layout updating unit 1106 updates the layout of the target spread created by the spread layout creating unit 802 with the recreated layout thus determined.

Figure 13:
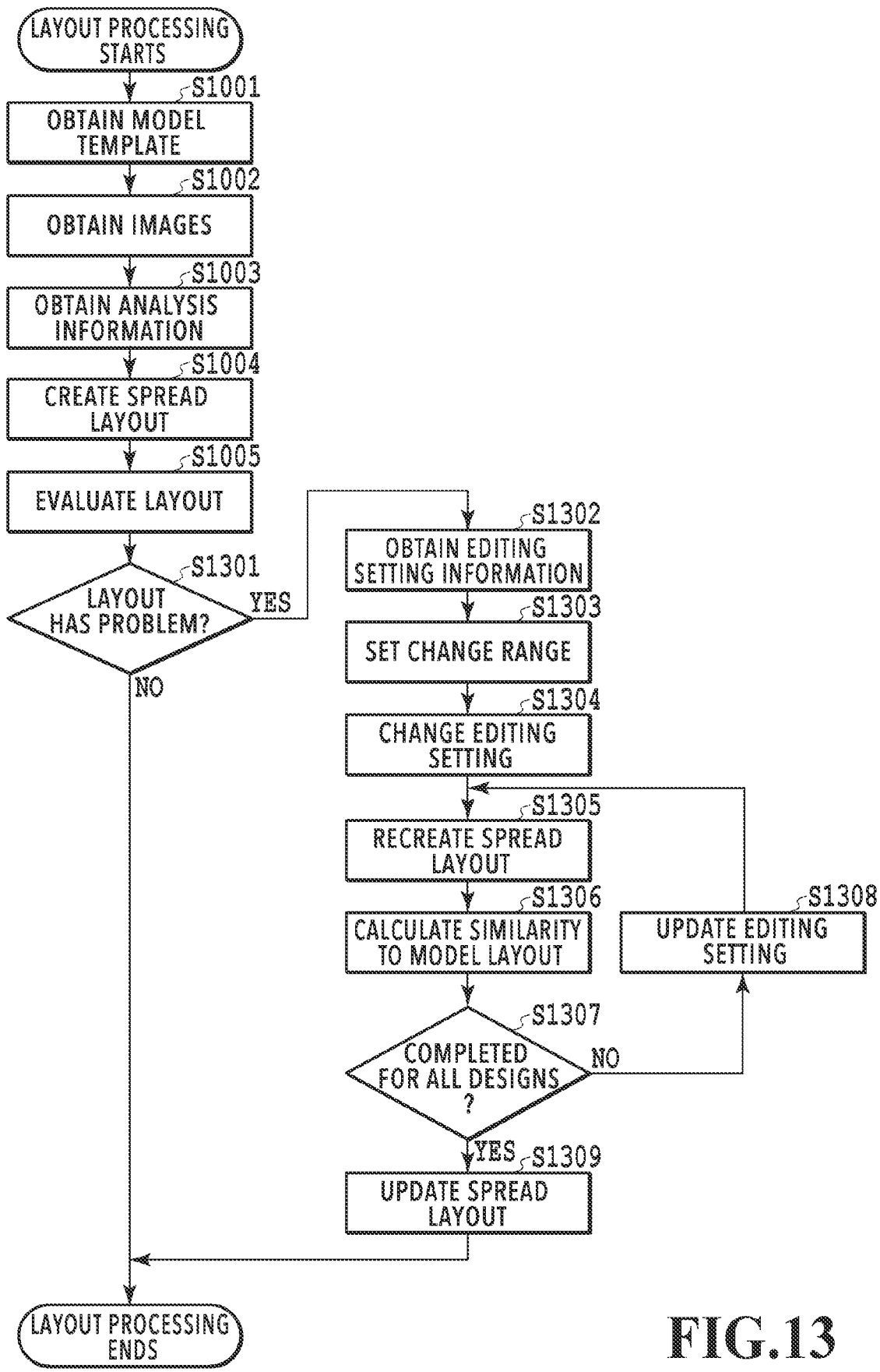
FIG. 13 is a flowchart illustrating details of a layout creating method.

FIG. 13 is a flowchart showing the details of the layout creating processing shown in S608 in FIG. 6A. As shown in FIG. 6A, the processing in FIG. 13 is performed for each target spread. S1001 to S1005 are the same as those in the first embodiment and are therefore not described.

In S1301, the layout evaluating unit 1101 evaluates whether the finished quality of the layout has a problem, and changes processing performed after that depending on the evaluation result. In a case where the finished quality does not have a problem, the processing ends. In a case the finished quality has a problem, the processing proceeds to S1302.

In S1302, the edit setting information obtaining unit 1102 obtains information on the editing (embellishment) added to the target slot the finished quality of which has a problem. In S1303, the change range setting unit 1103 sets the change range for the layouts to be recreated. The change range for the layouts indicates the number of layout types each with a different frame embellishment, and the number of such layout types is determined based on the number of frame embellishments.

In S1304, the spread layout recreating unit 1104 selects any one of the frame embellishments set by the change range setting unit 1103.

In S1305, the spread layout recreating unit 1104 recreates a layout based on the frame embellishment set by the edit setting change. In S1306, the spread layout similarity calculating unit 1105 calculates the similarity between the model template of the target spread and the recreated layout.

In S1307, the spread layout recreating unit 1104 determines whether layouts have been recreated for all the designs in the change range set by the change range setting unit 1103 and, depending on the determination result, switches processing performed after that. The processing proceeds to S1309 if the recreation has been completed for all the designs, and proceeds to S1308 if not.

In S1308, the spread layout recreating unit 1104 updates the edit settings to use one of the frame embellishments which is set by the change range setting unit 1103 and yet to be used to recreate a layout. Then, the processing proceeds to S1305, where a spread layout is recreated based on the updated edit settings.

In S1309, the spread layout updating unit 1106 updates the layout created by the spread layout creating unit 802 with a recreated layout. Specifically, the layout is updated with a layout which is recreated by the spread layout recreating unit 1104 and has the highest similarity to the model template.

OTHER EMBODIMENTS

The present invention is not limited to the above-described example in the second embodiment where an evaluation is made on a layout to which an embellishment is added according to a model template, and processing to be performed after that is changed based on the result of the evaluation. For example, processing may be changed not to add the embellishment according to the model template.

In the examples described in the above embodiment, a layout is created using a template. Alternatively, a layout may be created without using a template. In that case, information on the positions to place images, layering, image angles, frame embellishments, and the like may be obtained from the model album.

Further, the first embodiment and the second embodiment may be combined. Specifically, the evaluation criteria about frame embellishments described in the second embodiment may be added to the determination results of the evaluation criteria in the first embodiment.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-045618, filed Mar. 16, 2020, which is hereby incorporated by reference wherein in its entirety.

What is claimed is:

1. An image processing method comprising:
obtaining album data on a model album to serve as an example, analysis information on a model image placed in the model album, a group of candidate images used to create an album, and analysis information on each of the group of candidate images;
selecting a similar image similar to the model image from the group of candidate images based on the analysis information on the model image and the analysis information on the group of candidate images;
creating a layout according to a template included in the album data by placing the similar image in a slot at a same position as a slot in which the model image corresponding to the similar image is placed;
evaluating the layout created; and
based on an evaluation result of the evaluating, changing a type of editing performed on the similar image to place the similar image into the slot,
wherein the analysis information includes assigning image scores to the group of candidate images, wherein the image score of an image indicates whether the image is suitable for the album, wherein the image score includes a focus level that is determined using edge detection, wherein a difference in luminance between start and end points of the detected edge is divided by a distance between each start point and a corresponding end point.

2. The image processing method according to claim 1, wherein
the evaluating includes evaluating whether finished quality of the created layout is suitable for the album, and
the changing includes changing the type of the editing performed on the similar image in a case where the evaluation result indicates that the finished quality of the created layout is not suitable for the album.

3. The image processing method according to claim 2, wherein
the evaluating includes evaluating that the finished quality of the created layout is not suitable for the album in a case where a region of a main subject in the similar image in the created layout is partially lost.

4. The image processing method according to claim 3, wherein
the type of the editing includes trimming, and
the changing includes shifting the similar image placed in the created layout so that the region of the main subject is not partially lost by the trimming.

5. The image processing method according to claim 2, wherein
the evaluating includes evaluating that the finished quality of the created layout is not suitable for the album in a case where a resolution of the similar image in the created layout does not satisfy a predetermined value.

6. The image processing method according to claim 5, wherein
the predetermined value is determined based on at least the model image placed in the slot at the same position as the slot where the similar image is placed.

7. The image processing method according to claim 5, wherein
the type of the editing includes resizing of the similar image, and
the changing includes resizing the similar image so that the resolution of the similar image equals or exceeds the predetermined value and placing the resized similar image in the slot.

8. The image processing method according to claim 2, wherein
the evaluating includes evaluating that the finished quality of the created layout is not suitable for the album in a case where a region of a main subject in the similar image in the created layout is blocked by a second slot.

9. The image processing method according to claim 8, wherein
the type of the editing includes layering to place the second slot over the first slot, and
the changing includes selecting a different similar image to place in the first slot from the group of candidate images so that the region of the main subject is not blocked by the second slot.

10. The image processing method according to claim 2, wherein
the evaluating includes evaluating that the finished quality of the created layout is not suitable for the album in a case where a region of a main subject in the similar image in the created layout overlaps with a binding portion of the album.

11. The image processing method according to claim 10, wherein
the changing includes selecting a different similar image to place in the slot from the group of candidate images so that the region of the main subject does not overlap with the binding portion of the album.

12. The image processing method according to claim 2, wherein
the evaluating includes evaluating that the finished quality of the created layout is not suitable for the album in a case where a region of a main subject in the similar image overlaps with a frame embellishment added to the slot where the similar image in the created layout is placed.

13. The image processing method according to claim 12, wherein
the type of editing includes adding a frame embellishment to the slot, and
the changing includes creating a layout in which a different frame embellishment is added.

14. The image processing method according to claim 13, wherein
the changing includes creating layouts in each of which a different frame embellishment is added, and determining that one of the layouts thus created which has a highest similarity to a model template in which the model image is placed is a layout after change.

15. The image processing method according to claim 1, wherein
in a case where the type of the editing is changed by the changing, the creating includes recreating a layout according to the changed type.

16. The image processing method according to claim 15, further comprising:
outputting album data on the album in which each spread is formed by the recreated layout or the layout created by the creating.

17. An image processing apparatus comprising:
a processor; and
a memory including instructions stored thereon, which, when executed by the processor, cause the image processing apparatus to:
  obtain album data on a model album to serve as an example, analysis information on a model image placed in the model album, a group of candidate images used to create an album, and analysis information on each of the group of candidate images;
  select a similar image similar to the model image from the group of candidate images based on the analysis information on the model image and the analysis information on the group of candidate images;
  create a layout according to a template included in the album data by placing the similar image in a slot at a same position as a slot in which the model image corresponding to the similar image is placed;
  evaluate the layout created; and
  change, based on an evaluation result obtained by the evaluating unit, a type of editing performed on the similar image to place the similar image into the slot,
wherein the analysis information includes assigning image scores to the group of candidate images, wherein the image score of an image indicates whether the image is suitable for the album, wherein the image score includes a focus level that is determined using edge detection, wherein a difference in luminance between start and end points of the detected edge is divided by a distance between each start point and a corresponding end point.

18. A non-transitory computer readable storage medium storing a program which causes a computer to function as:
an obtaining unit configured to obtain album data on a model album to serve as an example, analysis information on a model image placed in the model album, a group of candidate images used to create an album, and analysis information on each of the group of candidate images;
a selecting unit configured to select a similar image similar to the model image from the group of candidate images based on the analysis information on the model image and the analysis information on the group of candidate images;
a creating unit configured to create a layout according to a template included in the album data by placing the similar image in a slot at a same position as a slot in which the model image corresponding to the similar image is placed;
an evaluating unit configured to evaluate the layout created; and
a changing unit configured to change, based on an evaluation result obtained by the evaluating unit, a type of editing performed on the similar image to place the similar image into the slot,
wherein the analysis information includes assigning image scores to the group of candidate images, wherein the image score of an image indicates whether the image is suitable for the album, wherein the image score includes a focus level that is determined using edge detection, wherein a difference in luminance between start and end points of the detected edge is divided by a distance between each start point and a corresponding end point.

19. The non-transitory computer readable storage medium according to claim 18, wherein
the evaluating unit evaluates whether finished quality of the created layout is suitable for the album, and
the changing unit changes the type of the editing of the similar image in a case where the evaluation result indicates that the finished quality of the created layout is not suitable for the album.

20. The non-transitory computer readable storage medium according to claim 18, wherein
in a case where the type of the editing is changed by the changing unit, the creating unit recreates a layout according to the changed type.

* * * * *